(12) United States Patent
Noh et al.

(10) Patent No.: US 9,807,758 B2
(45) Date of Patent: *Oct. 31, 2017

(54) METHOD AND APPARATUS FOR TRANSMITTING REFERENCE SIGNAL IN WIRELESS COMMUNICATION SYSTEM INCLUDING RELAY STATION

(71) Applicant: LG ELECTRONICS INC., Seoul (KR)

(72) Inventors: Min Seok Noh, Anyang-si (KR); Sung Ho Moon, Anyang-si (KR); Kyu Jin Park, Anyang-si (KR); Jae Hoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/267,539

(22) Filed: Sep. 16, 2016

(65) Prior Publication Data

US 2017/0006590 A1  Jan. 5, 2017

Related U.S. Application Data

(63) Continuation of application No. 14/949,215, filed on Nov. 23, 2015, now Pat. No. 9,480,062, which is a
(Continued)

(30) Foreign Application Priority Data

Jul. 19, 2010  (KR) .......................... 10-2010-0069320

(51) Int. Cl.
*H04W 4/00* (2009.01)
*H04W 72/04* (2009.01)
(Continued)

(52) U.S. Cl.
CPC ............ *H04W 72/042* (2013.01); *H04B 7/14* (2013.01); *H04B 7/155* (2013.01);
(Continued)

(58) Field of Classification Search
None
See application file for complete search history.

(56) References Cited

U.S. PATENT DOCUMENTS 8,040,904 B2 * 10/2011 Cai ........................ H04B 7/026
370/401
8,259,637 B2    9/2012 Bertrand et al.
(Continued)

FOREIGN PATENT DOCUMENTS

CN    101420702 A    4/2009
CN    101472338 A    7/2009
(Continued)

OTHER PUBLICATIONS

"Part 16: Air Interface for Broadband Wireless Access Systems—Amendment 1: Multihop Relay Specification," IEEE Standard for Local and metropolitan area networks, IEEE Computer Society and the IEEE Microwave Theory and Techniques Society, Jun. 12, 2009, IEEE Std 802.16j-2009.

(Continued)

*Primary Examiner* — Phirin Sam
(74) *Attorney, Agent, or Firm* — Birch, Stewart, Kolasch & Birch, LLP

(57) ABSTRACT

A method and a relay node (RN) for demodulating a relay physical downlink control channel (R-PDCCH) in a wireless communication system are discussed. The method according to an embodiment includes demodulating the R-PDCCH based on cell-specific reference signals transmitted on at least one first antenna port or based on user equipment (UE)-specific reference signals transmitted on a second
(Continued)

antenna port. A type of reference signals among the cell-specific reference signals or the UE-specific reference signals, which is being used to demodulate the R-PDCCH, is configured by a higher layer.

14 Claims, 39 Drawing Sheets

Related U.S. Application Data continuation of application No. 14/462,133, filed on Aug. 18, 2014, now Pat. No. 9,295,050, which is a continuation of application No. 13/384,105, filed as application No. PCT/KR2010/004696 on Jul. 19, 2010, now Pat. No. 8,837,347.

(60) Provisional application No. 61/254,695, filed on Oct. 25, 2009, provisional application No. 61/230,118, filed on Jul. 31, 2009, provisional application No. 61/226,285, filed on Jul. 17, 2009.

(51) Int. Cl.
*H04B 7/155* (2006.01)
*H04B 7/26* (2006.01)
*H04L 5/00* (2006.01)
*H04B 7/14* (2006.01)
*H04L 25/02* (2006.01)

(52) U.S. Cl.
CPC ....... *H04B 7/15507* (2013.01); *H04B 7/2606* (2013.01); *H04L 5/0007* (2013.01); *H04L 5/0023* (2013.01); *H04L 5/0032* (2013.01); *H04L 5/0048* (2013.01); *H04L 5/0051* (2013.01); *H04L 5/0091* (2013.01); *H04L 5/0094* (2013.01); *H04L 25/0226* (2013.01); *H04L 25/0204* (2013.01); *H04L 25/0242* (2013.01)

(56) References Cited

U.S. PATENT DOCUMENTS

| | | | | |
|---|---|---|---|---|
| 8,311,061 B2* | 11/2012 | Yu | ................ | H04W 28/06 370/474 |
| 8,335,466 B2* | 12/2012 | Cai | ................ | H04W 72/042 455/434 |
| 8,385,268 B2* | 2/2013 | Chen | ................ | H04L 1/0038 370/315 |
| 8,477,675 B2* | 7/2013 | Cai | ................ | H04B 7/155 370/312 |
| 8,600,441 B2 | 12/2013 | Xu et al. | | |
| 8,649,281 B2* | 2/2014 | Nam | ................ | H03M 13/6306 370/252 |
| 8,804,600 B2* | 8/2014 | Suda | ................ | H04B 7/155 370/315 |
| 8,885,575 B2* | 11/2014 | Yu | ................ | H04L 5/0053 370/315 |
| 9,295,050 B2* | 3/2016 | Noh | ................ | H04B 7/155 |
| 2004/0193971 A1 | 9/2004 | Soong et al. | | |
| 2004/0223474 A1 | 11/2004 | Kwon et al. | | |
| 2005/0041589 A1 | 2/2005 | Kwon et al. | | |
| 2008/0085709 A1 | 4/2008 | Jeon et al. | | |
| 2009/0168714 A1 | 7/2009 | Tanaka et al. | | |
| 2010/0061360 A1 | 3/2010 | Chen et al. | | |
| 2010/0167743 A1 | 7/2010 | Palanki et al. | | |
| 2010/0272009 A1 | 10/2010 | Cheng et al. | | |
| 2010/0272086 A1 | 10/2010 | Jung et al. | | |
| 2010/0275083 A1* | 10/2010 | Nam | ................ | H03M 13/6306 714/748 |
| 2010/0322227 A1 | 12/2010 | Luo | | |
| 2010/0323711 A1 | 12/2010 | Damnjanovic et al. | | |
| 2011/0103292 A1 | 5/2011 | Pasad et al. | | |
| 2011/0268064 A1 | 11/2011 | Chen et al. | | |
| 2011/0306291 A1* | 12/2011 | Ma | ................ | H04B 7/155 455/9 |
| 2012/0093061 A1 | 4/2012 | Charbit et al. | | |
| 2012/0320849 A1 | 12/2012 | Frederiksen et al. | | |
| 2013/0301531 A1 | 11/2013 | Tao | | |
| 2013/0303217 A1 | 11/2013 | Tao | | |
| 2014/0080497 A1 | 3/2014 | Frenne et al. | | |

FOREIGN PATENT DOCUMENTS

| | | |
|---|---|---|
| JP | 2008-66982 A | 3/2008 |
| JP | 2008-148277 A | 6/2008 |
| KR | 10-2008-0103382 A | 11/2008 |
| KR | 10-0896204 B1 | 5/2009 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211, V8.2.0, Mar. 2008, pp. 1-65.
Catt, "Design of Backhaul Control Channel for Type 1 Relay in LTE-A", 3GPP TSG RAN WG1 #57, San Fransisco, USA, May 2009, 4 pages, R1-091990.
Koivisto, "LTE-advanced research in 3GPP," GIGA seminar '08, Nokia, Dec. 4, 2008, pp. 1 to 24.
Kotecha et al., "LTE: MIMO Techniques in 3GPP-LTE," Freescale Technology Forum, Nov. 5, 2008, pp. 1 to 22.
NEC Group, "Control Structure for Relay Type 1 nodes", 3GPP TSG-RAN WG1 #57Bis, Los Angelas, CA, Jun. 2009, 5 pages, R1-092965.
Nortel Networks, Control Channel and Data Channel Design for Relay Link in LTE-Advanced, 3GPP TSG-RAN1 #55bis, Ljubljana, Slovenia, Jan. 2009, 17 pages, R1-090153.
Nortel, "Control Channel and Data Channel Design for Relay Link in LTE-Advanced", 3GPP TSG-RAN Working Group 1 Meeting #56, R1-090753, Feb. 9-13, 2009, 9 pages.
Nortel, "Discussion paper on the control channel and data channel optimization for relay link", 3GPP TSG-RAN Working Group 1 Meeting #56bis, R1-091384, Seoul, Korea, Mar. 23-27, 2009, 9 pages.
Teyeb et al., "Dynamic Relaying in 3GPP LTE-Advanced Networks," EURASIP Journal on Wireless Communications and Networking, Mar. 2009, vol. 2009, Article ID 731317, pp. 1 to 11.
Zte, "Considerations on Control Channel of Backhaul Link", TSG-RAN WG1 #58bis, R1-093814, Miyazaki, Japan, Oct. 12-16, 2009, 7 pages.

* cited by examiner

Antenna 0

Antenna 0

| eNB PDCCH (3 symbols) | PDSCH for macro UEs | | |
| --- | --- | --- | --- |
| | Relay Zone (R-PDCCH & R-PDSCH) | | Idle |
| | PDSCH for macro UEs | | |

(b)

| RN PDCCH (2 symbols) | Transition Gap | | Transition Gap |
| --- | --- | --- | --- |

METHOD AND APPARATUS FOR TRANSMITTING REFERENCE SIGNAL IN WIRELESS COMMUNICATION SYSTEM INCLUDING RELAY STATION

CROSS-REFERENCE TO RELATED APPLICATIONS

This application is a Continuation of co-pending U.S. patent application Ser. No. 14/949,215 filed on Nov. 23, 2015, which is a Continuation of U.S. patent application Ser. No. 14/462,133 filed on Aug. 18, 2014 (now U.S. Pat. No. 9,295,050 issued on Mar. 22, 2016), which is a Continuation of U.S. patent application Ser. No. 13/384,105 filed on Jan. 13, 2012 (now U.S. Pat. No. 8,837,347 issued on Sep. 16, 2014), which is filed as the National Phase of PCT/KR2010/004696 filed on Jul. 19, 2010, which claims the benefit under 35 U.S.C. §119(e) to U.S. Provisional Application No. 61/254,695 filed on Oct. 25, 2009, 61/230,118 filed on Jul. 31, 2009, and 61/226,285 filed on Jul. 17, 2009, and under 35 U.S.C. §119(a) to Korean Patent Application No. 10-2010-0069320 filed on Jul. 19, 2010, all of which are hereby expressly incorporated by reference into the present application.

BACKGROUND OF THE INVENTION

Field of the Invention

The present invention relates to wireless communications and, more particularly, to a method and apparatus for transmitting reference signals in a wireless communication system including a relay station.

Discussion of the Related Art

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a least square (LS) method is used.

$$\hat{h} = y/p = h + n/p = h + \hat{n} \qquad \text{[Equation 1]}$$

The accuracy of the channel estimation value ĥ estimated using the reference signal p is determined by the value n̂. To accurately estimate the value h, the value n̂ must converge on 0. To this end, the influence of the value n̂ has to be minimized by estimating a channel using a large number of reference signals. A variety of algorithms for a better channel estimation performance may exist.

Meanwhile, a wireless communication system including a relay station (RS) has recently been developed. A relay station functions to extend the cell coverage and improve transmission performance. If a base station (BS) serves UE placed at the boundaries of the coverage of the BS through a relay station, an effect that the cell coverage is extended can be obtained. Furthermore, the transmission capacity can be increased if a relay station improves reliability in signal transmission between a BS and UE. If UE is placed in a shadow region although it is within the coverage of a BS, the UE may use a relay station. Uplink and downlink between a BS and a relay station is a backhaul link, and uplink and downlink between a BS and UE or a relay station and UE is an access link. Hereinafter, a signal transmitted through the backhaul link is called a backhaul signal, and a signal transmitted through the access link is called an access signal.

There is a need for a method of efficiently transmitting reference signals for a relay station.

SUMMARY OF THE INVENTION

The present invention provides a method and apparatus for transmitting reference signals in a wireless communication system including a relay station.

In an aspect, a method of transmitting reference signals in a wireless communication system including a relay station is provided. The method includes generating a plurality of reference signals for a plurality of antenna ports, respectively, mapping the plurality of reference signals to a relay zone within at least one resource block according to a predetermined reference signal pattern, and transmitting the at least one resource block through the plurality of antenna ports, wherein the plurality of reference signals comprises at least one cell-specific reference signal (CRS) of a 3rd generation partnership project (3GPP) long-term evolution (LTE) Rel-8 system. The relay zone may occupy a fourth orthogonal frequency division multiplexing (OFDM) symbol to a thirteenth OFDM symbol or a fifth OFDM symbol to a thirteenth OFDM symbol in one subframe. The plurality of reference signals may be mapped to a relay physical downlink control channel (R-PDCCH) region in which a control signal for the relay station is transmitted in the relay zone. The R-PDCCH may occupy first 3 OFDM symbols of the relay zone or occupies first 3 OFDM symbols of a second slot. A number of the antenna ports through which the at least one CRS may be transmitted is one of 1, 2, and 4. The plurality of reference signals may further comprise a plurality of relay reference signals for additional antenna ports or a demodulation reference signal (DMRS) of an LTE-advanced (LTE-A) system. The at least one CRS and some of the plurality of relay reference signals may be mapped by being multiplexed according to a code division multiplexing (CDM) scheme by using an orthogonal code. The method may further include transmitting a reference signal indicator indicating whether to demodulate an R-PDCCH by using the at least one CRS or to demodulate an R-PDCCH by using the plurality of relay reference signals or the DMRS. The reference signal indicator may be transmitted through a higher layer or subjected to L1/L2 signaling using a PDCCH or broadcasting.

In another aspect, a method of estimating channels in a wireless communication system including a relay station is provided. The method includes receiving a plurality of reference signals through a relay zone within a downlink subframe, and performing channel estimation or data demodulation by processing the plurality of reference signals, wherein the plurality of reference signals comprises at least one cell-specific reference signal (CRS) of a 3rd generation partnership project (3GPP) long-term evolution (LTE) Rel-8 system and comprises any one of a plurality of relay reference signals for additional antenna ports and a demodulation reference signal (DMRS) of an LTE-advanced (LTE-A) system. The plurality of reference signals may be mapped to a relay physical downlink control channel (R-PDCCH) region in which a control signal for the relay station is transmitted in the relay zone. A number of antenna ports through which the at least one CRS is transmitted may be one of 1, 2, and 4. The performing the channel estimation or the data demodulation may be based on a reference signal indicator indicating whether to demodulate an R-PDCCH using the at least one CRS or to demodulate an R-PDCCH using the plurality of RN reference signals or the DMRS. The reference signal indicator may be transmitted through a higher layer or subjected to L1/L2 signaling using a PDCCH or broadcasting.

In another aspect, an apparatus for estimating channels in a wireless communication system including a relay station is provided. The apparatus includes a radio frequency (RF) unit configured for receiving a plurality of reference signals through a relay zone within a downlink subframe, and a processor, coupled to the RF unit, configured for performing channel estimation or data demodulation by processing the plurality of reference signals, wherein the plurality of reference signals comprises at least one cell-specific reference signal (CRS) of a 3rd generation partnership project (3GPP) long-term evolution (LTE) Rel-8 system and comprises any one of a plurality of relay reference signals for additional antenna ports and a demodulation reference signal (DMRS) of an LTE-Advanced (LTE-A) system.

A reference signal for a relay station can be defined while reducing signaling overhead by demodulating a relay-physical downlink control channel (R-PDCCH) using the cell-specific reference signal (CRS) of a 3rd generation partnership project (3GPP) long-term evolution (LTE) Rel-8 system and the demodulation reference signal (DMRS) of an LTE-advanced (LTE-A) system.

BRIEF DESCRIPTION OF THE DRAWINGS

FIG. 13 is an example of a downlink subframe to which a relay zone has been allocated.

DETAILED DESCRIPTION OF THE EMBODIMENTS

As the reference signal sequence, a sequence generated through a computer based on phase shift keying (PSK) (i.e., a PSK-based computer generated sequence) may be used. The PSK may include, for example, binary phase shift keying (BPSK), quadrature phase shift keying (QPSK), and the like. Or, as the reference signal sequence, a constant amplitude zero auto-correlation (CAZAC) may be used. The CAZAC sequence may include, for example, a Zadoff-Chu (ZC)-based sequence, a ZC sequence with cyclic extension, a ZC sequence with truncation, and the like. Also, as the reference signal sequence, a pseudo-random (PN) sequence may be used. The PN sequence may include, for example, an m-sequence, a sequence generated through a computer, a gold sequence, a Kasami sequence, and the like. Also, a cyclically shifted sequence may be used as the reference signal sequence.

A reference signal can be classified into a cell-specific reference signal (CRS), an MBSFN reference signal, and a user equipment-specific reference signal (UE-specific RS). The CRS is transmitted to all the UEs within a cell and used for channel estimation. The MBSFN reference signal can be transmitted in subframes allocated for MBSFN transmission. The UE-specific reference signal is received by a specific UE or a specific UE group within a cell, and may be referred to a dedicated RS (DRS). The DRS is chiefly used by a specific UE or a specific UE group for the purpose of data demodulation.

First, a CRS is described.

Figure 1:
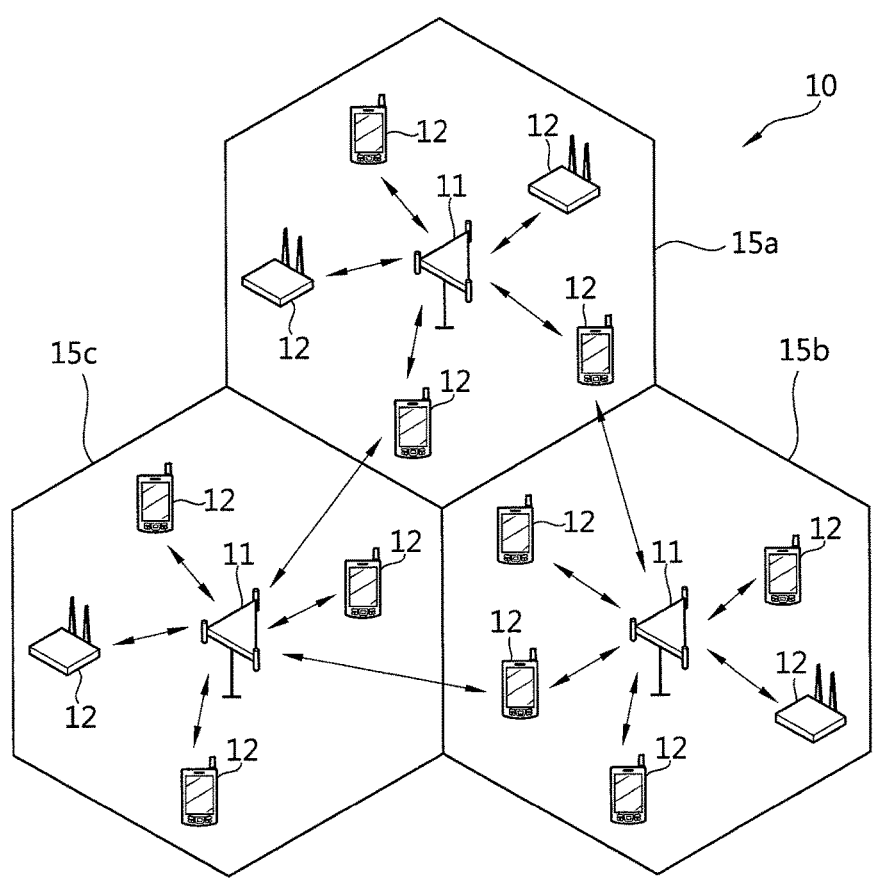
FIG. 1 shows a wireless communication system.
Figure 2:
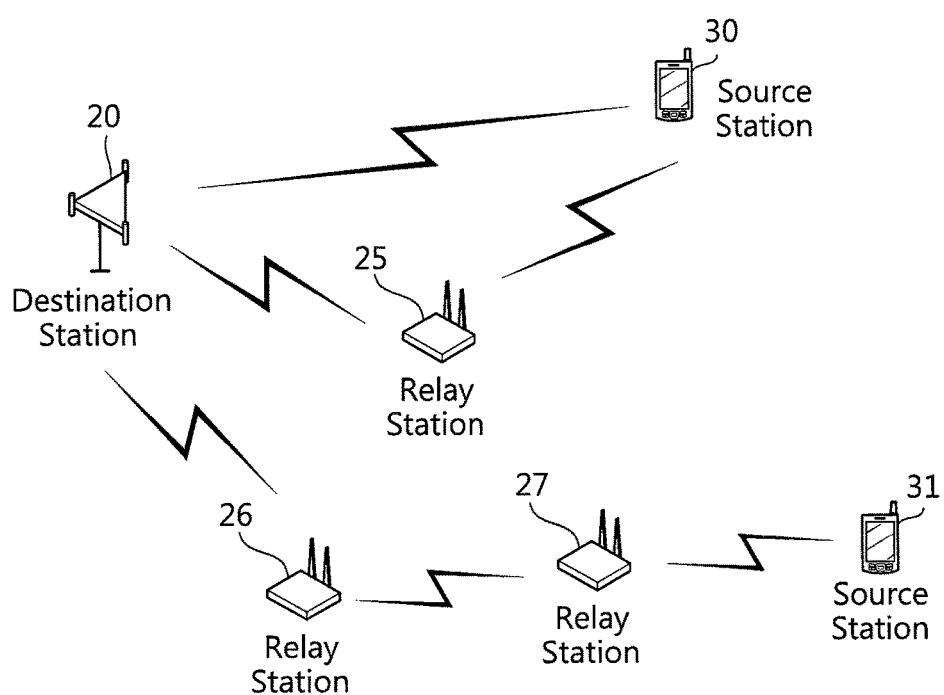
FIG. 2 shows a wireless communication system using a relay station.
Figure 3:
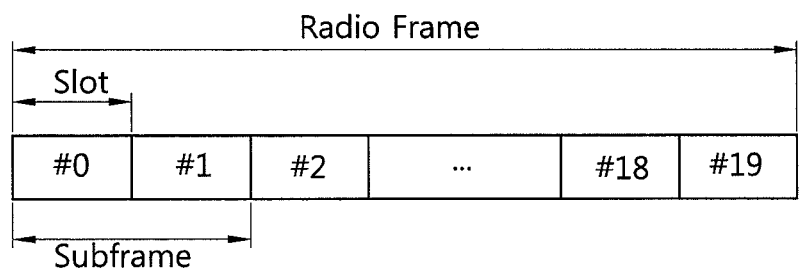
FIG. 3 shows the structure of a radio frame in 3GPP LTE.
Figure 4:
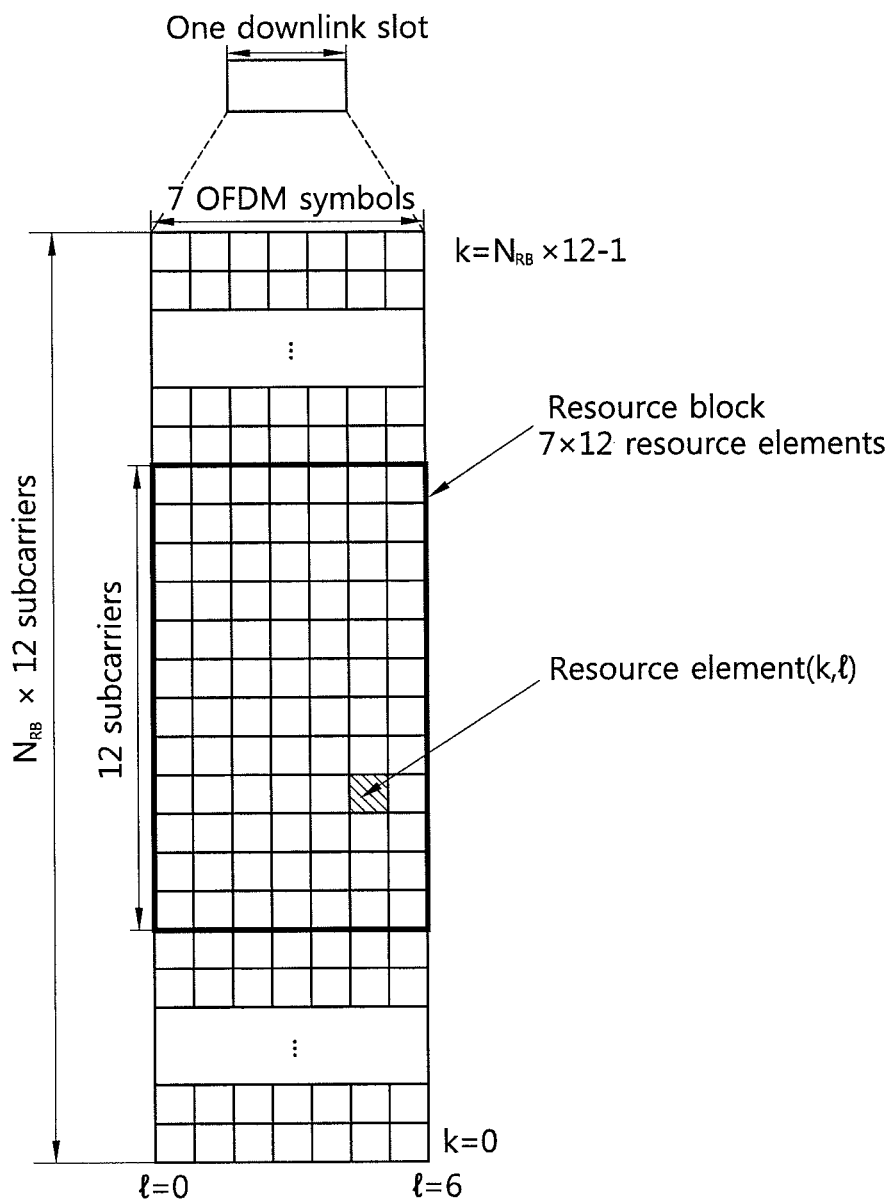
FIG. 4 shows an example of a resource grid of a single downlink slot.
Figure 5:
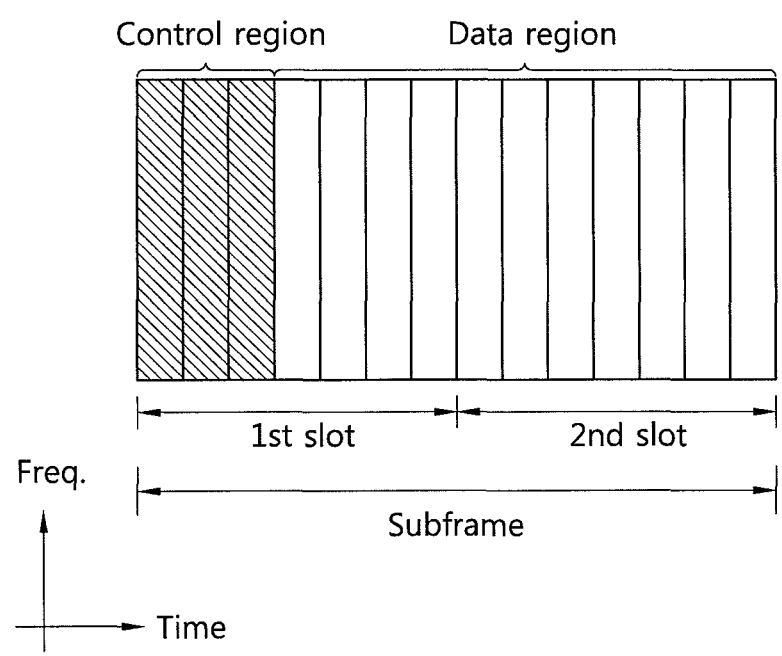
FIG. 5 shows the structure of a downlink subframe.
Figure 6:
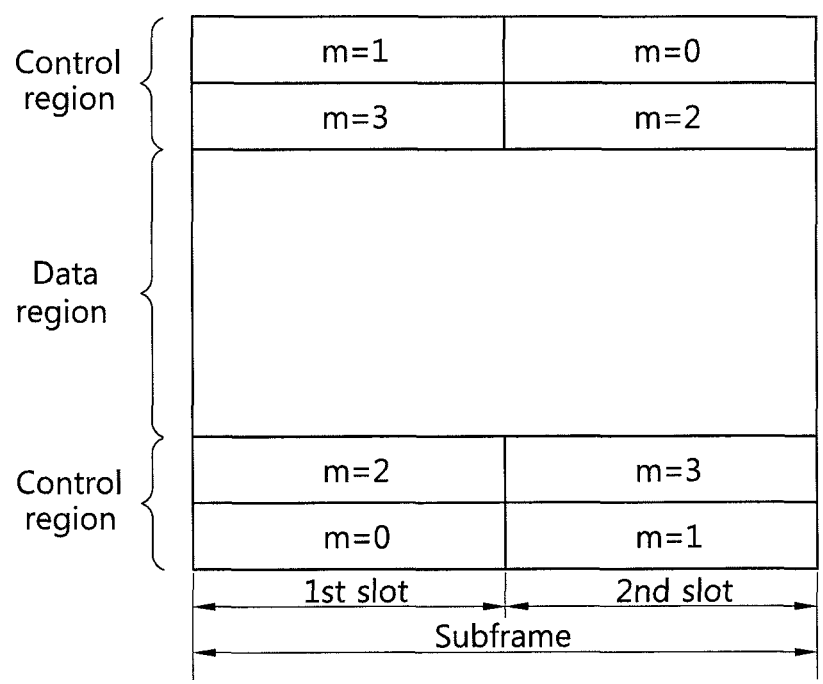
FIG. 6 shows the structure of an uplink subframe.
Figure 7:
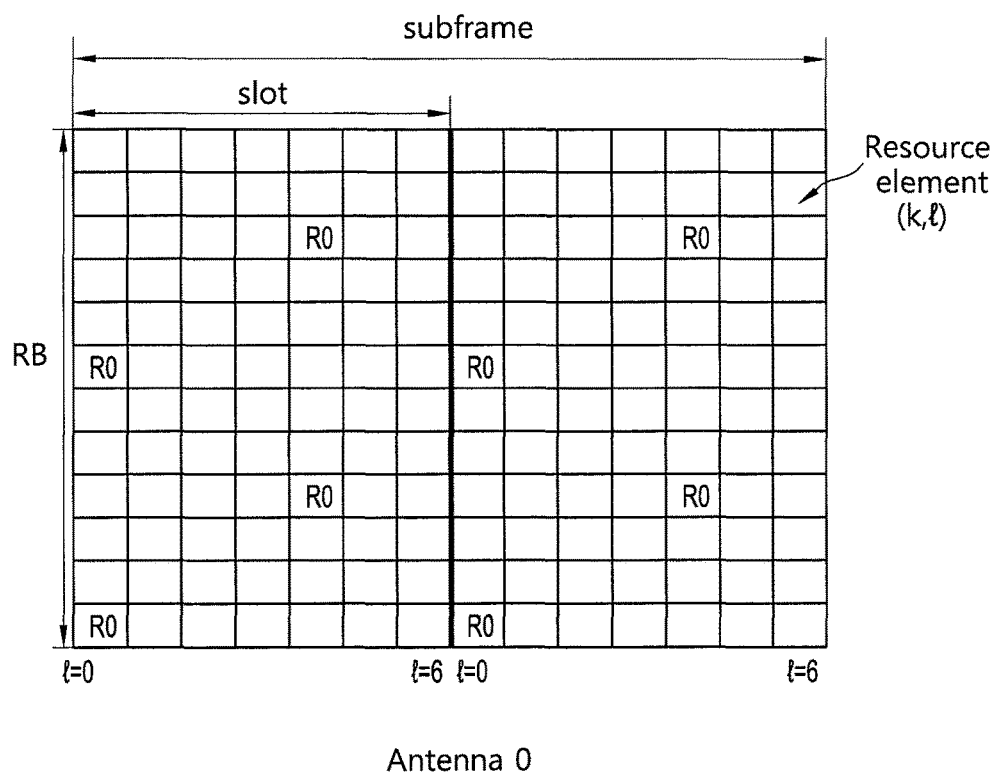
FIGS. 7 to 9 show an exemplary CRS structure.
Figure 8:
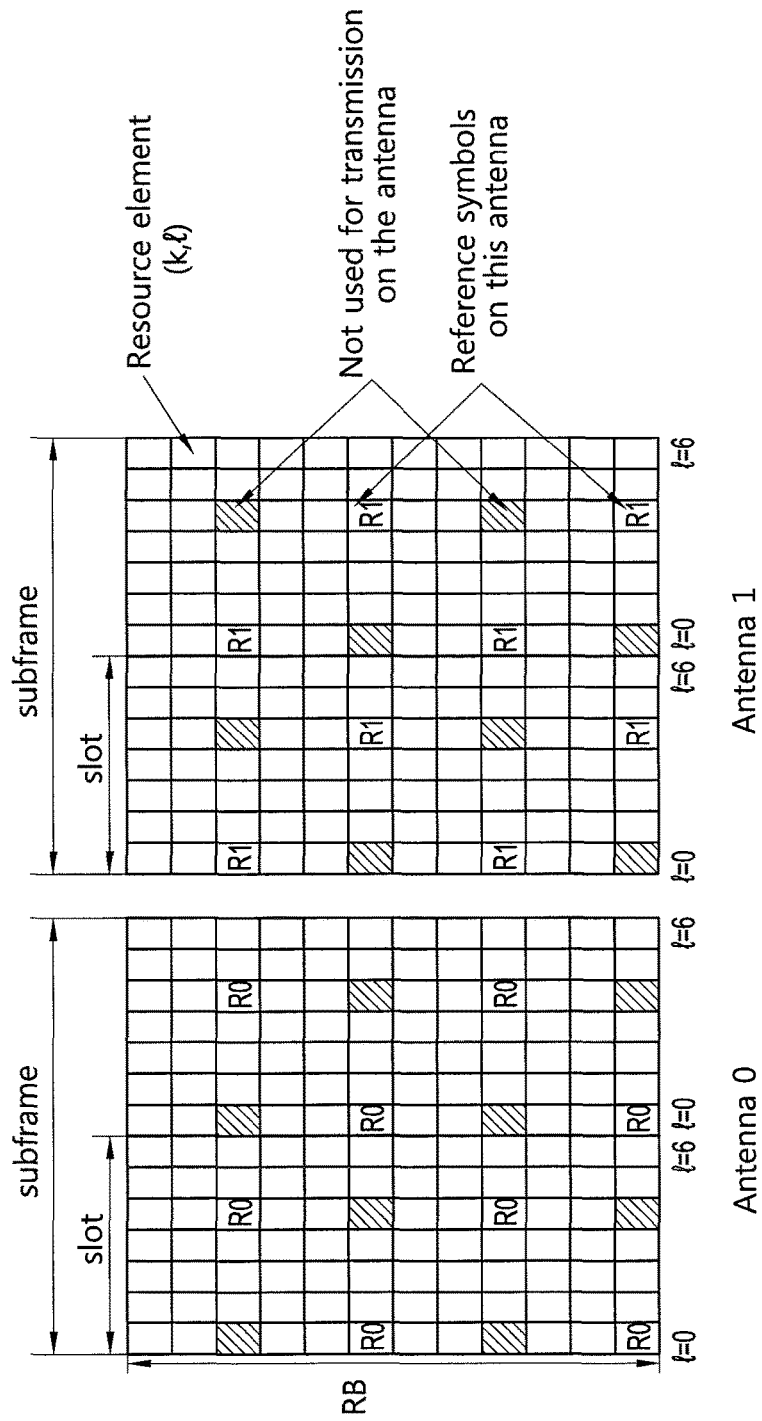
Figure 9:
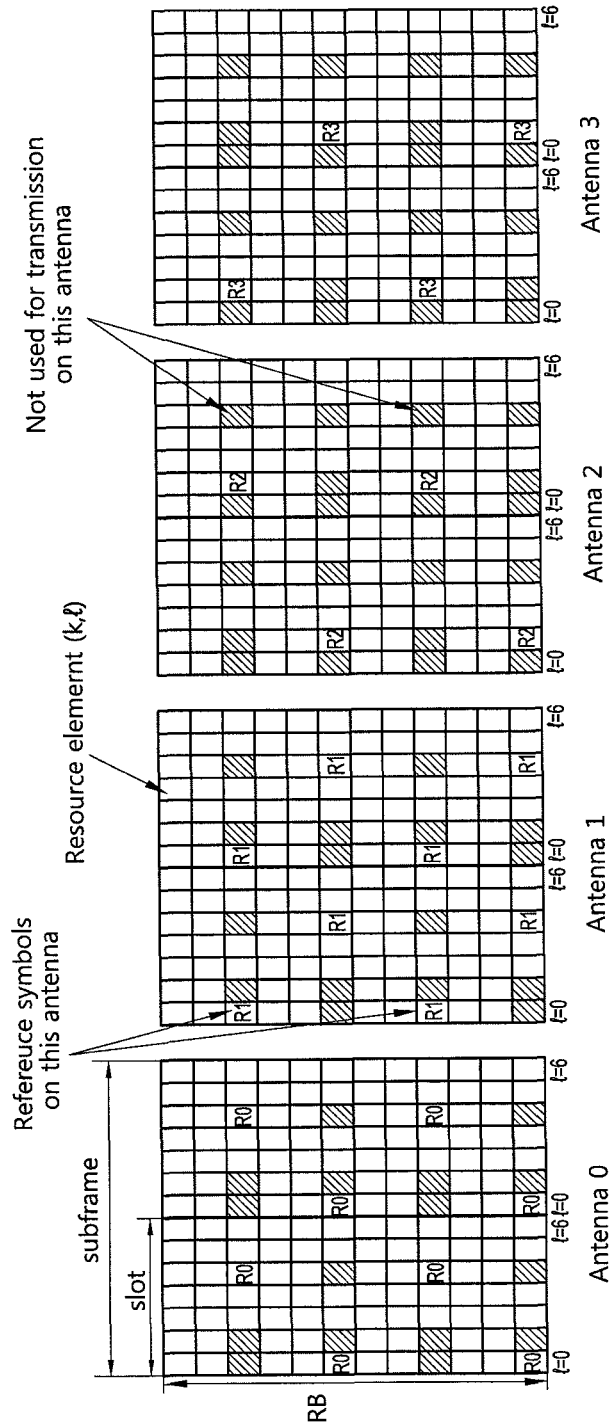

FIGS. 7 to 9 show an exemplary CRS structure. FIG. 7 shows an exemplary CRS structure when a BS uses one antenna. FIG. 8 shows an exemplary CRS structure when a BS uses two antennas. FIG. 9 shows an exemplary CRS structure when a BS uses four antennas. The section 6.10.1 of 3GPP TS 36.211 V8.2.0 (2008 March) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc. Furthermore, the CRS maybe used for channel quality estimation, CP detection and time/frequency synchronization.

Referring to FIG. 7 to FIG. 9, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index l, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes $N_{RB}$ resource blocks in a frequency domain, the number of RS subcarriers for each antenna on one OFDM symbol is $2 \times N_{RB}$. Therefore, a length of the CRS sequence is $2 \times N_{RB}$.

Equation 2 shows an example of a CRS sequence r(m).

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

Herein, m is 0, 1, ..., $2N_{RB}^{max}-1$. $N_{RB}^{max}$ denotes the number of resource blocks corresponding to a maximum bandwidth. For example, when using a 3GPP LTE system, $N_{RB}^{max}$ is 110. c(i) denotes a PN sequence as a pseudo-random sequence, and can be defined by a gold sequence having a length of 31. Equation 3 shows an example of a gold sequence c(n).

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 3]}$$

Herein, NC is 1600, $x_1(i)$ denotes a 1st m-sequence, and $x_2(i)$ denotes a 2nd m sequence. For example, the 1st m-sequence or the 2nd m-sequence can be initialized for each OFDM symbol according to a cell ID, a slot number in one radio frame, an OFDM symbol index in a slot, a CP type, etc.

In case of using a system having a bandwidth narrower than $N_{RB}^{max}$, a certain part with a length of $2 \times N_{RB}$ can be selected from an RS sequence generated in a length of $2 \times N_{RB}^{max}$.

The CRS may be used in the LTE-A system to estimate channel state information (CSI). If necessary for estimation of the CSI, channel quality indicator (CQI), a precoding matrix indicator (PMI), a rank indicator (RI), or the like may be reported from the UE.

A DRS is described below.

Figure 10:
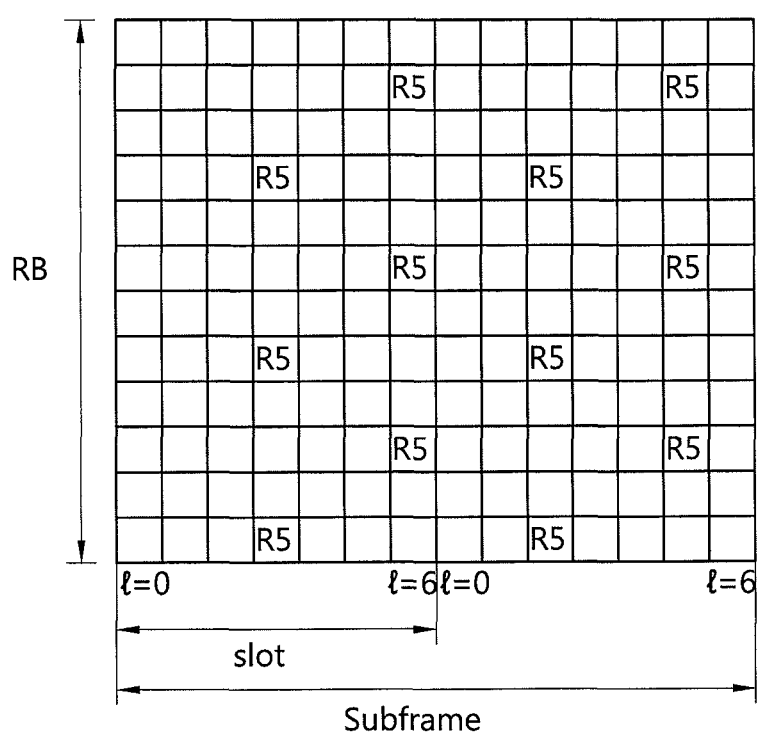
FIGS. 10 and 11 show examples of a DRS structure.
Figure 11:
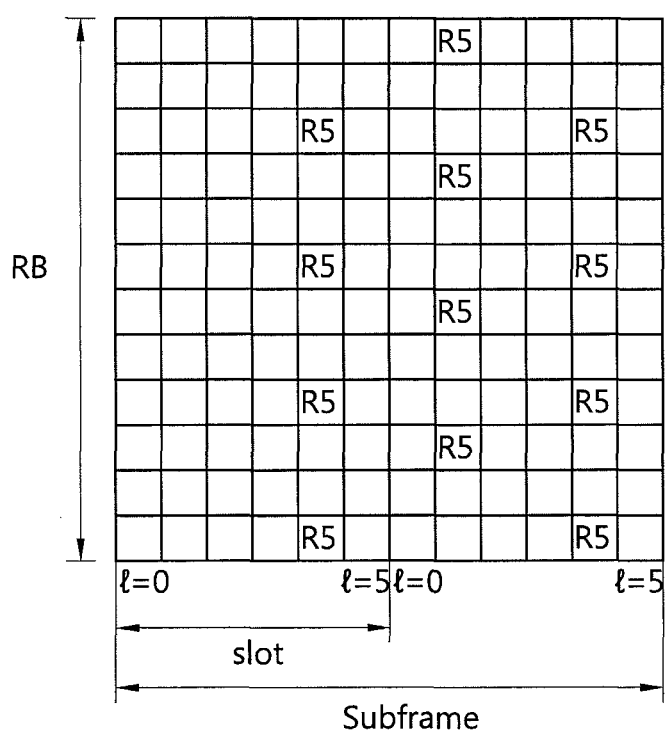

FIGS. 10 and 11 show examples of a DRS structure. FIG. 10 shows an example of the DRS structure in the normal CP. In the normal CP, a subframe includes 14 OFDM symbols. R5 indicates the reference signal of an antenna which transmits a DRS. On one OFDM symbol including a reference symbol, a reference signal subcarrier is positioned at intervals of four subcarriers. FIG. 11 shows an example of the DRS structure in the extended CP. In the extended CP, a subframe includes 12 OFDM symbols. On one OFDM symbol, a reference signal subcarrier is positioned at intervals of three subcarriers. For detailed information, reference can be made to Paragraph 6.10.3 of 3GPP TS 36.211 V8.2.0 (2008 March).

The position of a frequency domain and the position of a time domain within the subframe of a DRS can be determined by a resource block assigned for PDSCH transmission. A DRS sequence can be determined by a UE ID, and only a specific UE corresponding to the UE ID can receive a DRS.

A DRS sequence can be obtained using Equations 2 and 3. However, m in Equation 2 is determined by $N_{RB}^{PDSCH}$. $N_{RB}^{PDSCH}$ is the number of resource blocks corresponding to a bandwidth corresponding to PDSCH transmission. The length of a DRS sequence can be changed according to $N_{RB}^{PDSCH}$. That is, the length of a DRS sequence can be changed according to the amount of data assigned to a UE. In Equation 2, a first m-sequence $x_1(i)$ or a second m-sequence $x_2(i)$ can be reset according to a cell ID, the position of a subframe within one radio frame, a UE ID, etc. for every subframe.

A DRS sequence can be generated for every subframe and applied for every OFDM symbol. It is assumed that the number of reference signal subcarriers per resource block is 12 and the number of resource blocks is $N_{RB}^{PDSCH}$, within one subframe. The total number of reference signal subcarriers is $12 \times N_{RB}^{PDSCH}$. Accordingly, the length of the DRS sequence is $12 \times N_{RB}^{PDSCH}$. In the case in which DRS sequences are generated using Equation 2, m is 0, 1, . . . , $12N_{RB}^{PDscH}-1$. The DRS sequences are sequentially mapped to reference symbols. The DRS sequence is first mapped to the reference symbol and then to a next OFDM symbol, in ascending powers of a subcarrier index in one OFDM symbol.

In an LTE-A system, a DRS may be used as a Demodulation Reference Signal (DMRS) for demodulating a PDSCH. That is, the DMRS may be said to be a concept that the DRS of an LTE Rel-8 system used for beamforming has been expanded into a plurality of layers. The PDSCH and the DMRS may comply with the same precoding operation. The DMRS may be transmitted only in a resource block or layer which is scheduled by a BS, and orthogonality is maintained between layers.

Figure 12:
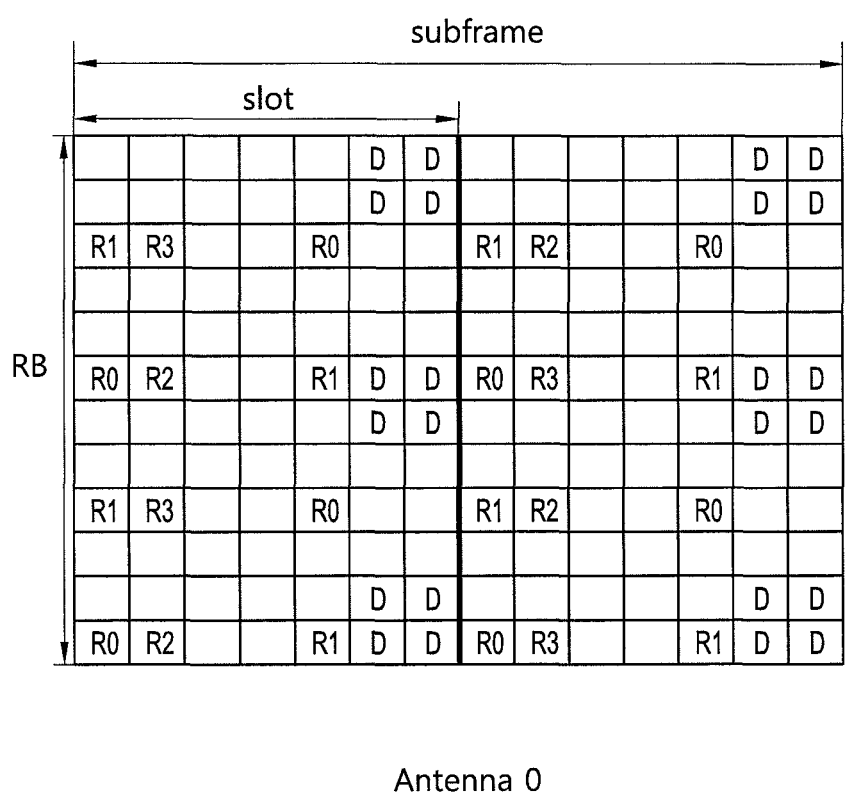
FIG. 12 is an example of the DMRS structure of an LTE-A system.

FIG. 12 is an example of the DMRS structure of an LTE-A system. The DMRS structure is the DMRS structure of an LTE-A system supporting four transmit antennas in a normal CP structure. A CSI-RS may use the CRS of an LTE Rel-8 system without change. The DMRS is transmitted in the last 2 OFDM symbols (i.e., sixth and seventh OFDM symbols and thirteenth and fourteenth OFDM symbols) of each slot. The DMRS is mapped to first, second, sixth, seventh, eleventh, and twelfth subcarriers within the OFDM symbols in which the DMRS is transmitted.

Further, a CRS can be used together with a DRS. For example, it is assumed that control information is transmitted through three OFDM symbols (l=0, 1, 2) of a first slot within a subframe. A CRS can be used in an OFDM symbol having an index of 0, 1, or 2 (l=0, 1, or 2), and a DRS can be used in the remaining OFDM symbol other than the three OFDM symbols. Here, by transmitting a predefined sequence which is multiplied by a downlink reference signal for each cell, interference between reference signals received by a receiver from neighbor cells can be reduced, and so the performance of channel estimation can be improved. The predefined sequence can be one of a PN sequence, an m-sequence, a Walsh Hadamard sequence, a ZC sequence, a GCL sequence, and a CAZAC sequence. The predefined sequence can be applied to each OFDM symbol within one subframe, and another sequence can be applied depending on a cell ID, a subframe number, the position of an OFDM symbol, and a UE ID.

In a wireless communication system including a relay station, a relay zone may be defined. The relay zone refers to a section where a control channel for a relay station (hereinafter referred to as an R-PDCCH) or a data channel for a relay station (hereinafter referred to as an R-PDSCH) is transmitted within a downlink subframe transmitted by a BS. That is, the relay zone is a section where backhaul transmission is performed within a downlink subframe.

FIG. 13 is an example of a downlink subframe to which a relay zone has been allocated.

FIG. 13(a) shows an example of a downlink backhaul subframe transmitted from a BS to a relay station or UE. First 3 OFDM symbols are regions occupied by PDCCHs transmitted by the BS. In the downlink backhaul subframe, the relay zone is started from a fourth OFDM symbol, and the relay zone through which an R-PDCCH or an R-PDSCH is transmitted may be multiplexed with a PDSCH for macro UEs in accordance with a frequency division multiplexing (FDM) scheme or a method of combining the FDM scheme and a time division multiplexing (TDM) scheme. A point at which the relay zone is started may be determined by the size of an RN PDCCH transmitted by the relay station. FIG. 13(b) shows an example of a downlink access subframe transmitted from a relay station to UE. When an RN PDCCH transmitted from the relay station to the UE occupies first 2 OFDM symbols, a BS may assign a point at which a relay zone is started in a downlink backhaul subframe as a fourth OFDM symbol. The relay zone may be allocated in a cell-specific way or an RN-specific way. Furthermore, the relay zone may be allocated dynamically or semi-persistently. Meanwhile, when the relay station transmits the RN PDCCH through the first 2 OFDM symbols and then receives an uplink control signal or uplink data from the UE, there is a need for a transition time from transmission to reception. Accordingly, the third OFDM symbol may be used as a transition gap.

Figure 14:
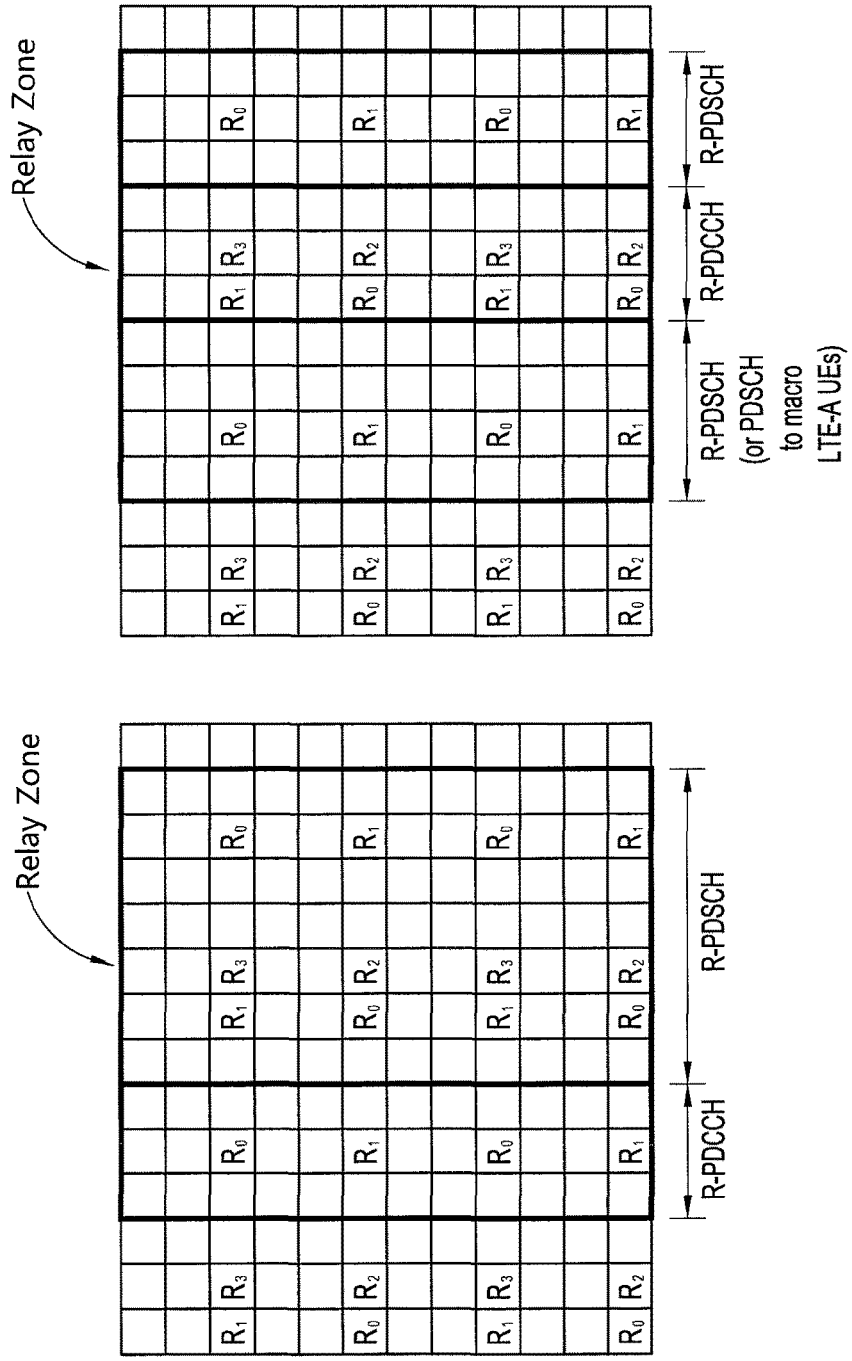
FIG. 14 is an example of a resource block to which a relay zone has been allocated.

FIG. 14 is an example of a resource block to which a relay zone has been allocated. In FIGS. 14(a) and 14(b), the relay zone is allocated from a fourth OFDM symbol to a thirteenth OFDM symbol. In FIG. 14(a), the fourth OFDM symbol to the sixth OFDM symbol are a region where an R-PDCCH is transmitted, and the seventh OFDM symbol to the thirteenth OFDM symbol are a region where an R-PDSCH is transmitted. In FIG. 14(b), an eighth OFDM symbol to a tenth OFDM symbol (i.e., the first 3 OFDM symbols of the second slot of one subframe) are a region where an R-PDCCH are transmitted, and a fourth OFDM symbol to a seventh OFDM symbol and an eleventh OFDM symbol to a thirteenth OFDM symbol are regions where an R-PDSCH or a PDSCH for a macro LTE-A UE is transmitted. Referring to FIG. 14, the R-PDCCH may be allocated right after the PDCCH region transmitted by the BS or may be allocated based on the second slot of the subframe. Meanwhile, in FIG. 14, R0 to R3 refer to resource elements to which reference signals for the antenna ports 0 to 3 of an LTE Rel-8 system are allocated.

Proposed methods of transmitting reference signals are described below in connection with embodiments.

A relay station may be introduced into an LTE-A system, and an LTE-A system may support a maximum of 8 transmit antennas. The relay station may receive a reference signal transmitted by a BS and perform channel estimation or data demodulation. Here, the relay station may use the CRS of an LTE Rel-8 system, the CSI-RS or demodulation reference signal (DMRS) of an LTE-A system, or a new CRS (it may be a DRS used in an LTE-A system on the basis of an LTE Rel-8 system) as the reference signal. Meanwhile, since a relay zone is allocated within a subframe in order to transmit an R-PDCCH or an R-PDSCH, a reference signal for a relay station needs to be allocated within the relay zone. Accordingly, a new reference signal pattern different from the existing reference signal pattern is required.

Figure 15:
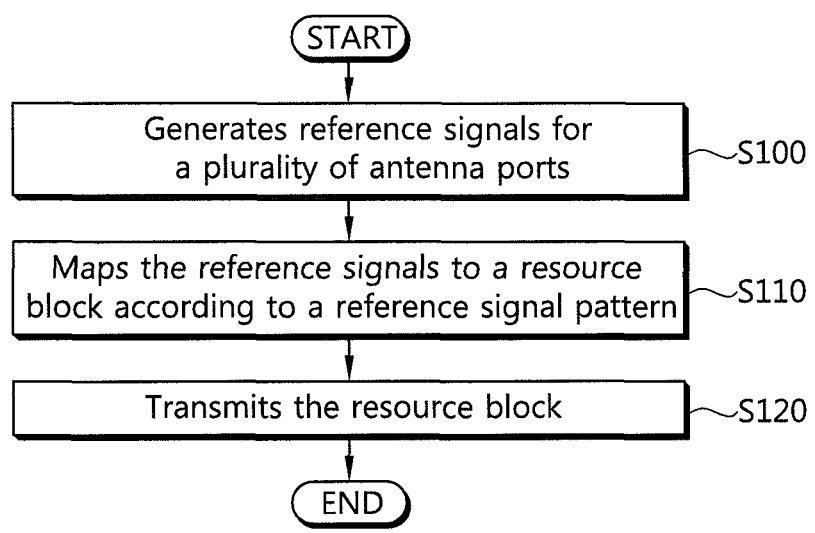
FIG. 15 is an embodiment of a proposed method of transmitting reference signals.

FIG. 15 is an embodiment of a proposed method of transmitting reference signals.

At step S100, a BS generates a plurality of reference signals for a plurality of antenna ports. At step S110, the BS maps the plurality of reference signals to at least one resource block according to a predetermined reference signal pattern. At step S120, the BS transmits the at least one resource block to a relay station. When the plurality of reference signals is mapped to the at least one resource block, the CRS of an LTE Rel-8 system may be used, and reference signals for additional antenna ports may be additionally mapped to the resource element.

The BS may inform the relay station whether the relay station has to decode an R-PDCCH or an R-PDSCH by using the CRS of an LTE Rel-8 system or the demodulation reference signal (DMRS) of an LTE-A system in order to demodulate the R-PDCCH or the R-PDSCH. Here, relevant information may be transmitted through a higher layer or may be subject to L1/L2 signaling using a PDCCH or broadcasting. Alternatively, the BS may inform the relay station whether the relay station has to decode an R-PDCCH or an R-PDSCH by using the CRS of an LTE Rel-8 system or a newly defined CRS in order to demodulate the R-PDCCH or the R-PDSCH. Here, relevant information may be transmitted through a higher layer or may be subject to L1/L2 signaling using a PDCCH or broadcasting. Types of the reference signals used by the relay station in order to demodulate the R-PDCCH are changed depending on a subframe type or are not changed dynamically. Furthermore, the plurality of reference signals may be mapped to an R-PDCCH region.

Various reference signal patterns to which the proposed method of transmitting reference signals is applied are described below. In the following description, (a) in the drawings corresponds to a case in which an R-PDCCH is allocated to the first N OFDM symbols of a relay zone as in FIGS. 14(a), and (b) in the drawings corresponds to a case in which the R-PDCCH is allocated to the first N OFDM symbols of the second slot of a subframe as in FIG. 14(b). Furthermore, in the following reference signal pattern, a horizontal axis indicates a time domain, and a vertical axis indicates a frequency domain.

First, a case in which the R-PDCCH is started from the fourth OFDM symbol of a subframe (i.e., a case in which a PDCCH transmitted by a BS occupies first 3 OFDM symbols) is described.

Figure 16:
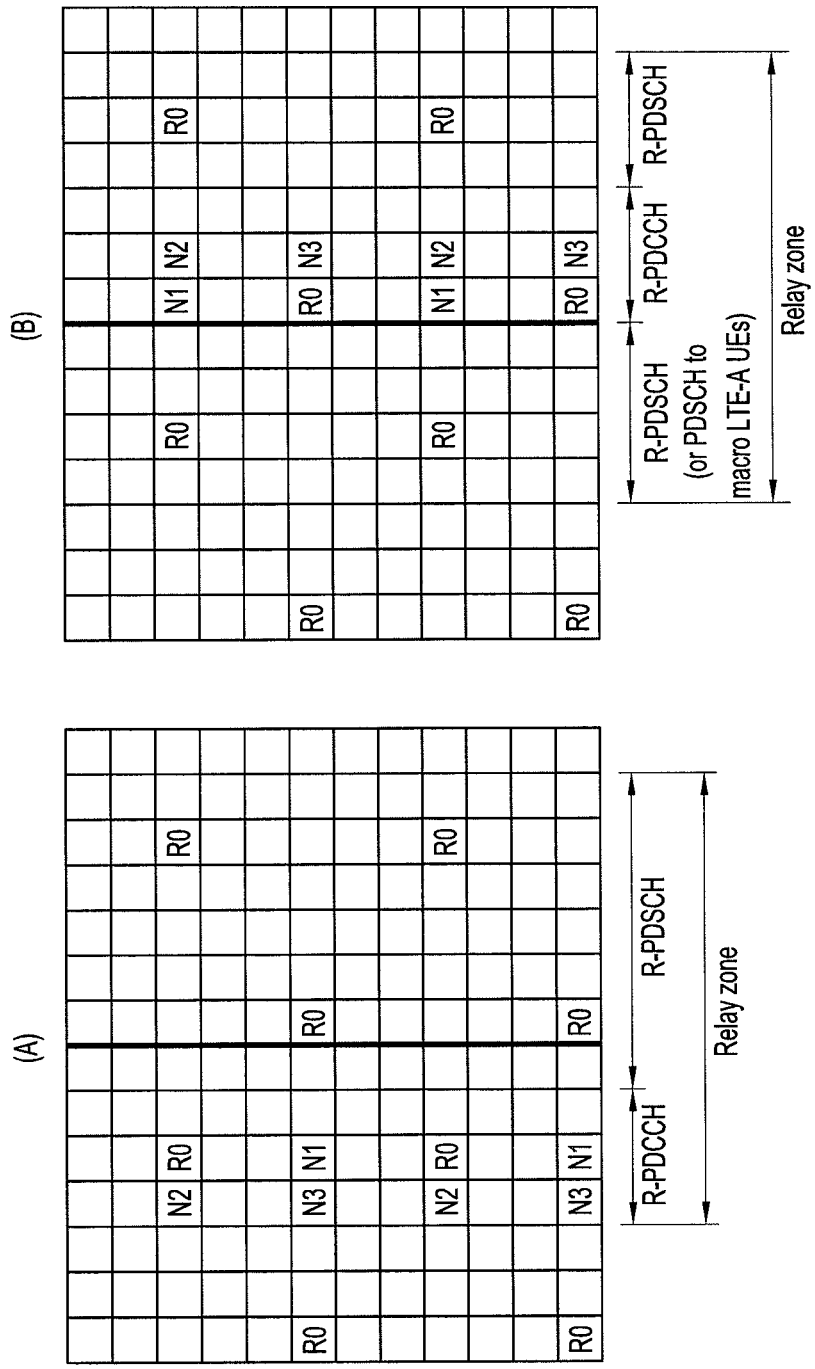
FIGS. 16 to 37 are examples of reference signal patterns according to proposed methods of transmitting reference signals.
Figure 17:
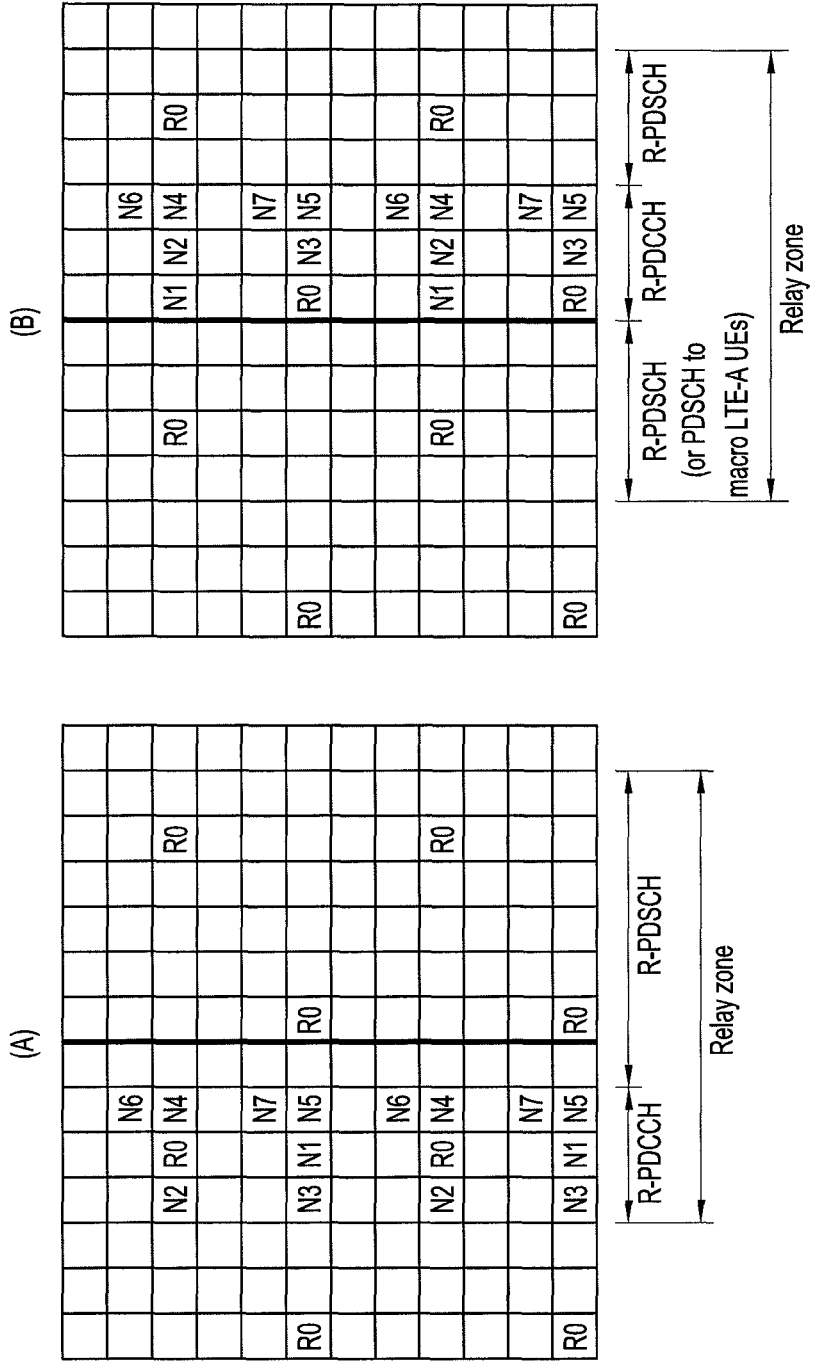

FIGS. 16 and 17 are examples of reference signal patterns according to proposed methods of transmitting reference signals.

FIGS. 16 and 17 correspond to normal CPs. In this case, CRSs R0 for antenna port 0 may be transmitted through the CRS of an LTE Rel-8 system. Resource elements to which the CRS R0 are mapped may comply with FIG. 7. The CRS R0 transmitted in an R-PDCCH region, from among the transmitted CRS R0, may be used as reference signals for a relay station. That is, in FIGS. 16(a) and 17(a), the CRS R0 transmitted in a fifth OFDM symbol within the R-PDCCH region may be used by the relay station. In FIGS. 16(b) and 17(b), the CRS R0 transmitted in an eighth OFDM symbol within the R-PDCCH region may be used by the relay station. Reference signals for the remaining antenna ports other than the antenna port 0 may be additionally mapped to resource elements within the R-PDCCH region. The relay station may receive the CRS R0 and the additionally mapped reference signals and perform channel estimation and data demodulation.

FIG. 16 is a case in which a maximum of four antennas are supported for the relay station. N1 to N3 that are reference signals for the relay station for the antenna ports 1 to 3 other than the CRS R0 may be additionally mapped to the resource elements within the R-PDCCH region. In FIG. 16(a), N1 may be mapped to the sixth and twelfth subcarriers of the fifth OFDM symbol to which the CRS R0 have been mapped. N2 and N3 may be mapped to the third subcarrier and the ninth subcarrier, respectively, and the sixth subcarrier and the twelfth subcarrier, respectively, of a fourth OFDM symbol. In FIG. 16(b), N1 may be mapped to the sixth and the twelfth subcarriers of the eighth OFDM symbol to which the CRS R0 have been mapped. N2 and N3 may be mapped to the third subcarrier and the ninth subcarrier, respectively, and the sixth subcarrier and the twelfth subcarrier, respectively, of a ninth OFDM symbol. N1 to N3 to which the reference signals are mapped are not limited to the reference signal pattern of the present embodiment, but may be mapped to any resource elements within an R-PDCCH region. For example, N2 and N3 may be mapped to a sixth OFDM symbol not the fourth OFDM symbol in FIG. 16(a) and may be mapped to a tenth OFDM symbol not the ninth OFDM symbol in FIG. 16(b). Furthermore, a subcarrier interval between the reference signals within the OFDM symbol may be adjusted in various ways and a plurality of reference signals may be transmitted over the entire band within one OFDM symbol.

FIG. 17 is a case in which a maximum of eight antennas are supported for the relay station. N1 to N7 that are reference signals for the relay station for the antenna ports 1 to 7 other than the CRS R0 may be additionally mapped to resource elements within the R-PDCCH region. In FIG. 17(a), N1 may be mapped to the fifth OFDM symbol to which the CRS R0 have been mapped, N2 and N3 may be mapped to a fourth OFDM symbol, and N4 to N7 may be mapped to a sixth OFDM symbol. In FIG. 17(b), N1 may be mapped to the eighth OFDM symbol to which the CRS R0 have been mapped, N2 and N3 may be mapped to a ninth OFDM symbol, and N4 to N7 may be mapped to a tenth OFDM symbol. The resource elements mapped to N1 to N7 are not limited to the reference signal pattern of the present embodiment, but may be mapped to any resource elements within an R-PDCCH region. For example, a subcarrier interval between the reference signals within the OFDM symbol may be adjusted in various ways and a plurality of reference signals may be transmitted over the entire band within one OFDM symbol.

Figure 18:
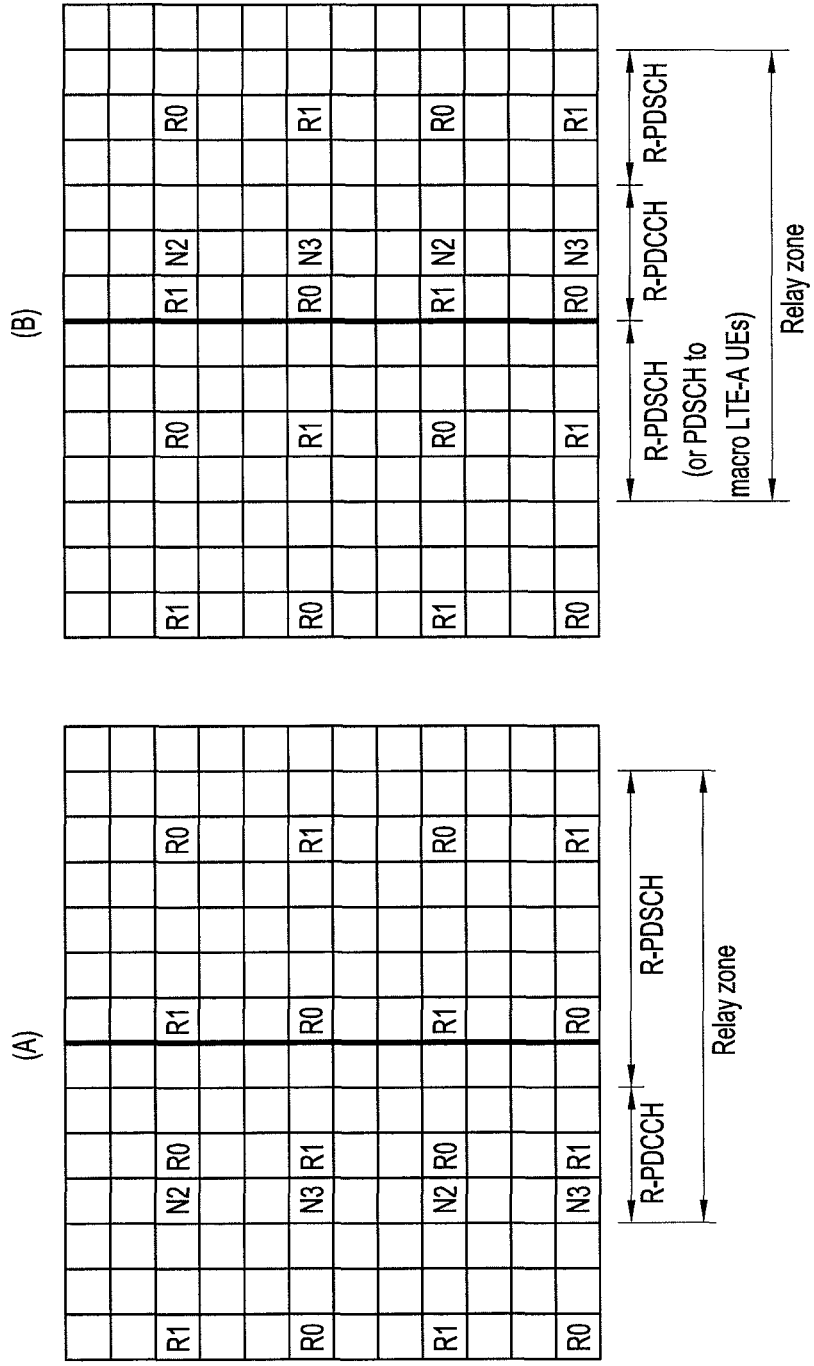
Figure 19:
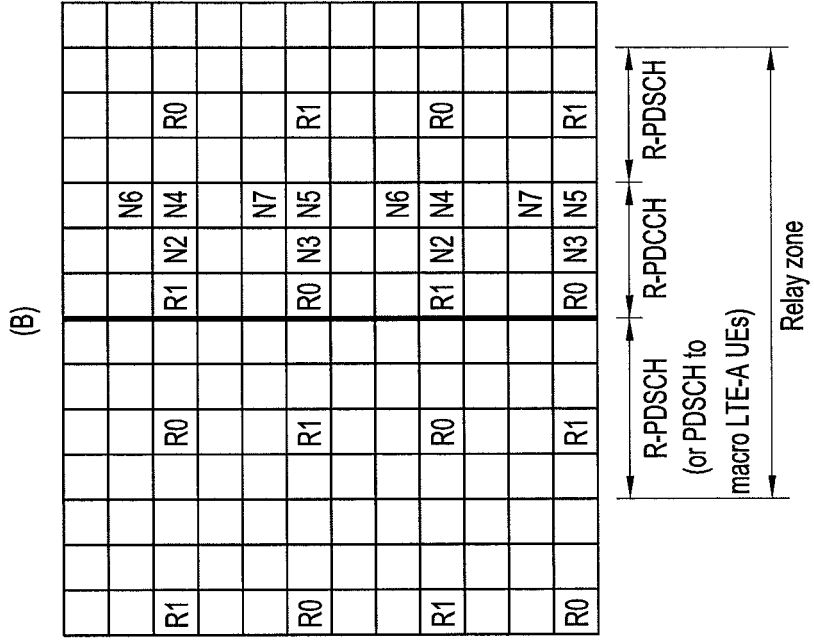
Figure 19:
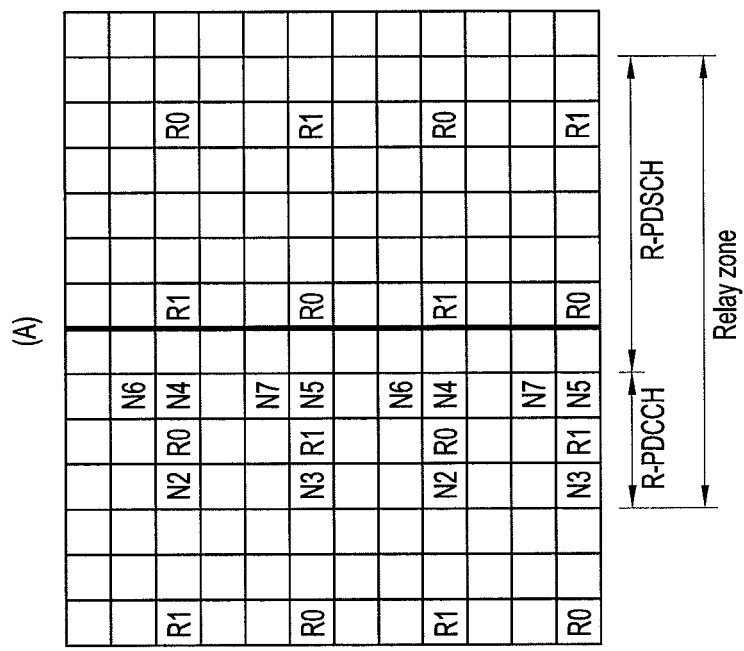

FIGS. 18 and 19 are other examples of reference signal patterns according to proposed methods of transmitting reference signals.

FIGS. 18 and 19 correspond to normal CPs. In this case, CRSs R0 and R1 for antenna ports 0 and 1 may be transmitted through the CRS of an LTE Rel-8 system. Resource elements to which the CRSs R0 and R1 are mapped may comply with FIG. 8. The CRSs R0 and R1 transmitted in an R-PDCCH region, from among the transmitted CRSs R0 and R1, may be used as reference signals for a relay station. That is, in FIGS. 18(a) and 19(a), the CRSs R0 and R1 transmitted in a fifth OFDM symbol within the R-PDCCH region may be used by the relay station. In FIGS. 18(b) and 19(b), the CRSs R0 and R1 transmitted in an eighth OFDM symbol within the R-PDCCH region may be used by the relay station. Reference signals for the remaining antenna ports other than the antenna ports 0 and 1 may be additionally mapped to resource elements within the R-PDCCH region. The relay station may receive the CRSs R0 and R1 and the additionally mapped reference signals and perform channel estimation and data demodulation.

FIG. 18 is a case in which a maximum of four antennas are supported for the relay station. N2 and N3 that are reference signals for the relay station for antenna ports 2 and 3 other than the CRSs R0 and R1 may be additionally mapped to resource elements within the R-PDCCH region. In FIG. 18(a), N2 and N3 may be mapped to the third subcarrier and the ninth subcarrier, respectively, and the sixth subcarrier and the twelfth subcarrier, respectively, of a fourth OFDM symbol. In FIG. 18(b), N2 and N3 may be mapped to the third subcarrier and the ninth subcarrier, respectively, and the sixth subcarrier and the twelfth subcarrier, respectively, of a ninth OFDM symbol. Resource elements to which N2 and N3 are mapped are not limited to the reference signal patterns of the present embodiments, but may be mapped to any resource elements within an R-PDCCH region. For example, N2 and N3 may be mapped to a sixth OFDM symbol not the fourth OFDM symbol in FIG. 18(a) and may be mapped to a tenth OFDM symbol not the ninth OFDM symbol in FIG. 18(b). Furthermore, a subcarrier interval between the reference signals within the OFDM symbol may be adjusted in various ways and a plurality of reference signals may be transmitted over the entire band within one OFDM symbol.

FIG. 19 is a case in which a maximum of eight antennas are supported for the relay station. N2 to N7 that are reference signals for the relay station for antenna ports 2 to 7 other than the CRSs R0 and R1 may be additionally mapped to resource elements within the R-PDCCH region. In FIG. 19(a), N2 and N3 may be mapped to a fourth OFDM symbol, and N4 to N7 may be mapped to a sixth OFDM symbol. In FIG. 19(b), N2 and N3 may be mapped to the ninth OFDM symbol, and N4 to N7 may be mapped to a tenth OFDM symbol. Resource elements to which N2 to N7 are mapped are not limited to the reference signal pattern of the present embodiment, but may be mapped to any resource elements within an R-PDCCH region. For example, a subcarrier interval between the reference signals within the OFDM symbol may be adjusted in various ways and N2 to N7 may be transmitted over the entire band within one OFDM symbol.

Figure 20:
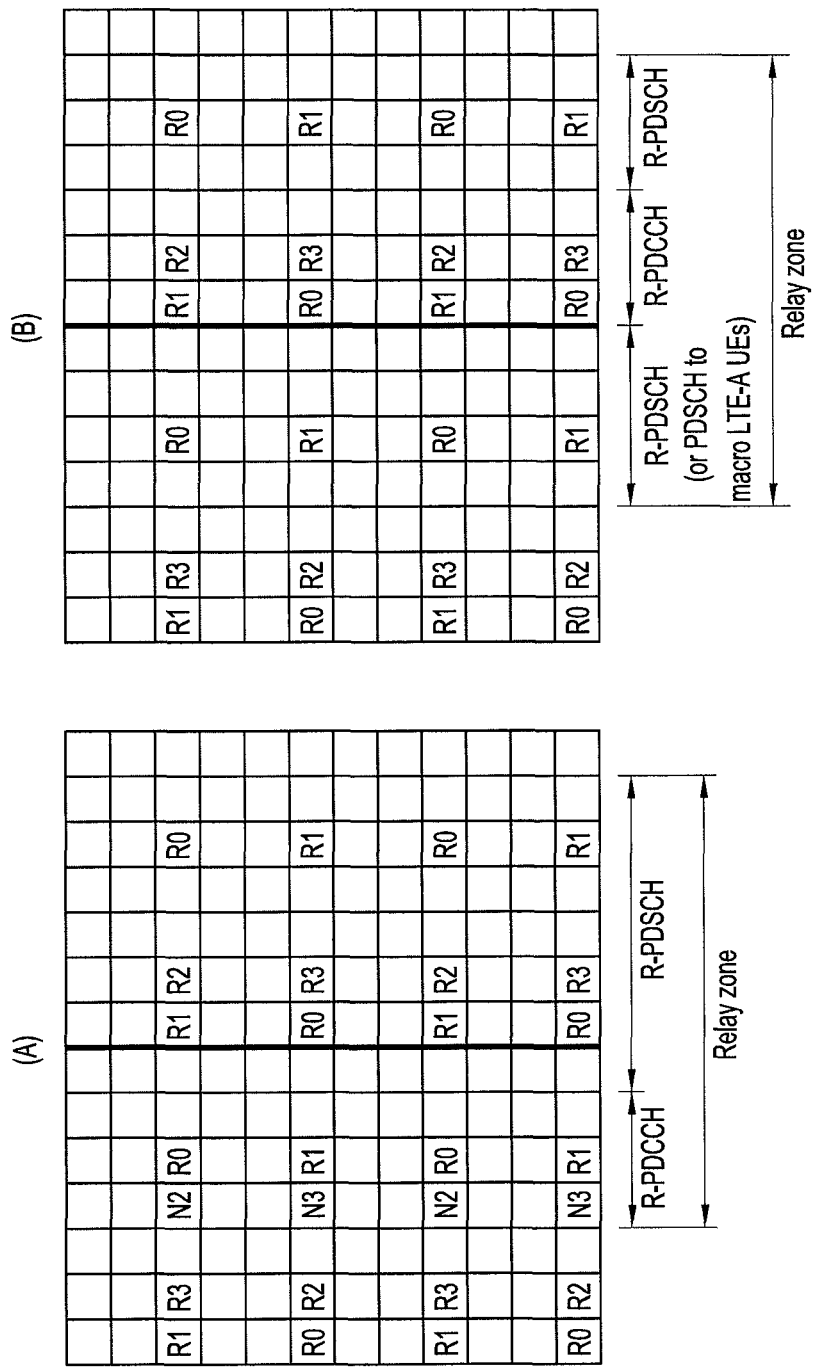
Figure 21:
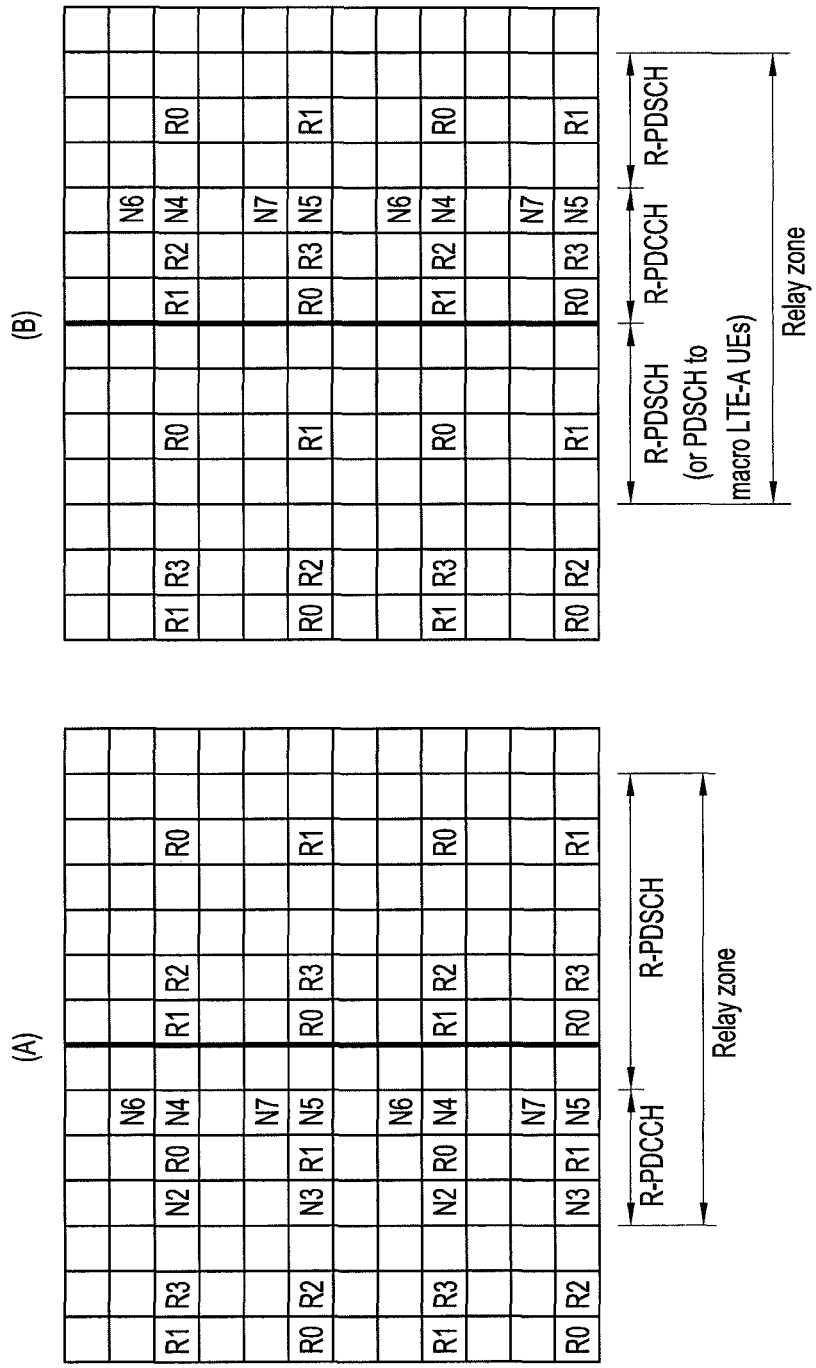
Figure 22:
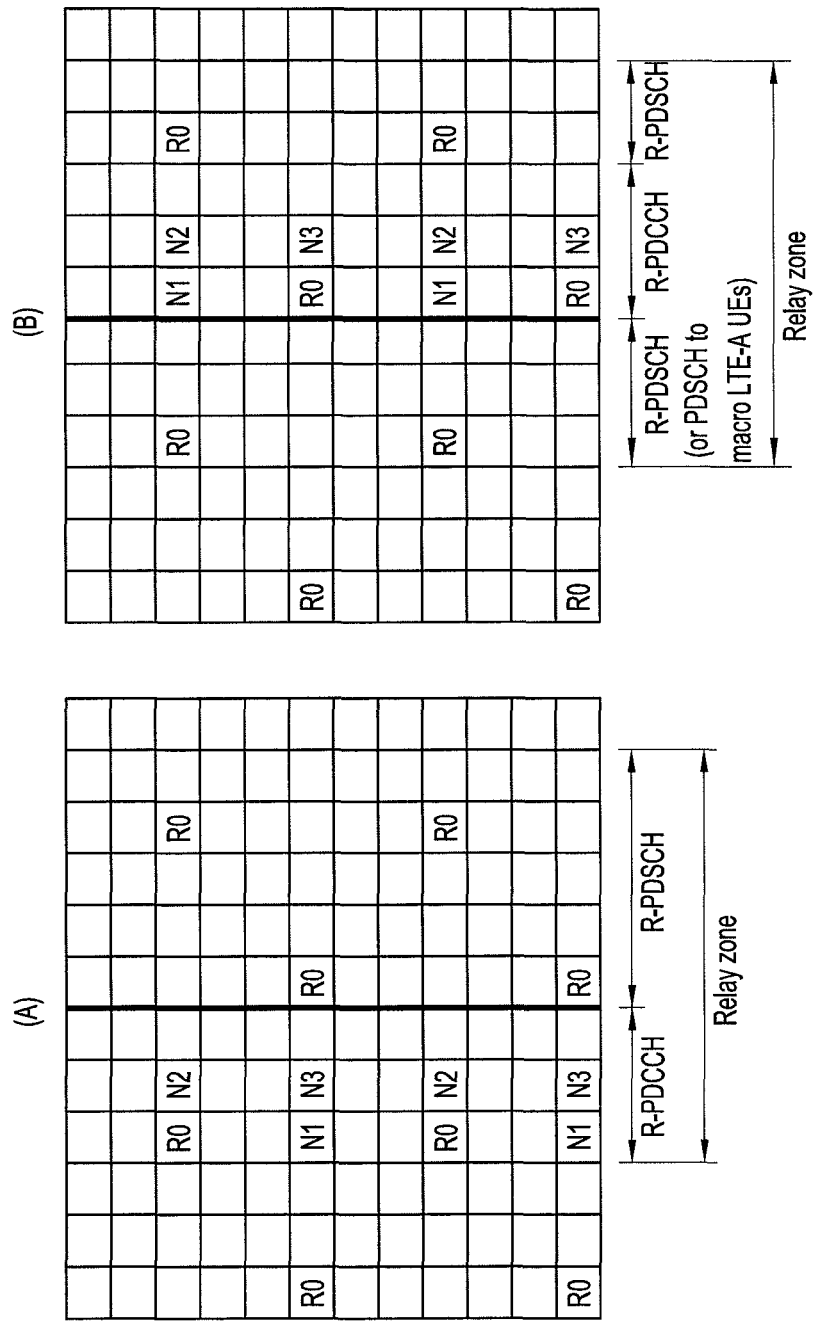
Figure 23:
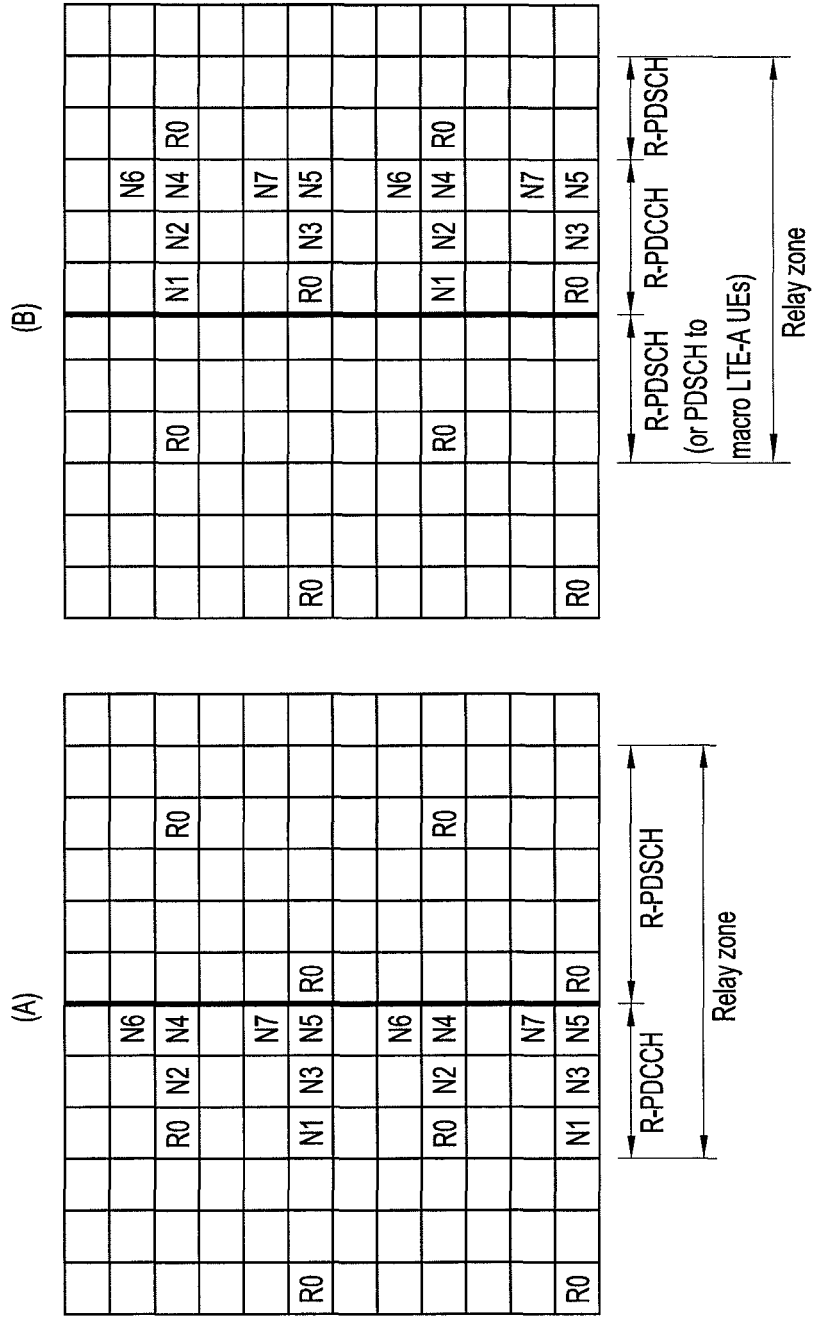

FIGS. 20 and 21 are still yet other examples of reference signal patterns according to proposed methods of transmitting reference signals.

FIGS. 20 and 21 are normal CPs. In this case, CRSs R0 to R3 for antenna ports 0 to 3 may be transmitted through the CRSs of an LTE Rel-8 system. Resource elements to which the CRSs R0 to R1 are mapped may comply with FIG. 9. The CRSs R0 to R3 transmitted in the R-PDCCH region, from among the transmitted CRSs R0 to R3, may be used as reference signals for a relay station. That is, in FIGS. 20(a) and 21(a), the CRSs R0 and R1 transmitted in a fifth OFDM symbol within an R-PDCCH region may be used by the relay station. In FIGS. 20(b) and 21(b), the CRSs R0 to R3 transmitted in eighth and ninth OFDM symbols within an R-PDCCH region may be used by the relay station. Reference signals for the remaining antenna ports for the antenna ports 0 to 3 may be additionally mapped to resource elements within the R-PDCCH region. The relay station may receive the CRSs R0 to R3 and the additionally mapped reference signals and perform channel estimation and data demodulation.

FIG. 20 is a case in which a maximum of four antennas are supported for the relay station. In FIG. 20(a), N2 and N3 that are reference signals for the relay station for the antenna ports 2 and 3 other than the CRSs R0 and R1 may be additionally mapped to resource elements within the R-PDCCH region. N2 and N3 may be mapped to the third subcarrier and the ninth subcarrier, respectively, and the sixth subcarrier and the twelfth subcarrier, respectively, of a fourth OFDM symbol. Resource elements to which N2 and N3 are mapped are not limited to the reference signal pattern of the present embodiment, but may be mapped to any resource elements within an R-PDCCH region. For example, N2 and N3 may be mapped to a sixth OFDM symbol not the fourth OFDM symbol in FIG. 20(a) and may be mapped to a tenth OFDM symbol not the ninth OFDM symbol in FIG. 20(b). Furthermore, for example, a subcarrier interval between the reference signals within the OFDM symbol may be adjusted in various ways and a plurality of reference signals may be transmitted over the entire band within one OFDM symbol. Meanwhile, in FIG. 20(b), since all the CRSs R0 to R3 for the antenna ports 0 to 3 of the LTE Rel-8 system are transmitted within the R-PDCCH region, reference signals for the relay station need not to be additionally mapped in order to support a maximum of four antennas.

FIG. 21 is a case in which a maximum of eight antennas are supported for the relay station. In FIG. 21(a), N2 to N7 that are reference signals for the relay station for antenna ports 2 to 7 other than the CRSs R0 and R1 may be additionally mapped to resource elements within the R-PDCCH region. N2 and N3 may be mapped to a fourth OFDM symbol, and N4 to N7 may be mapped to a sixth OFDM symbol. In FIG. 21(b), N4 to N7 that are reference signals for the relay station for antenna ports 4 to 7 other than the CRSs R0 to R3 may be additionally mapped to resource elements within the R-PDCCH region. N4 to N7 may be mapped to a tenth OFDM symbol. The resource elements to which N2 to N7 are mapped are not limited to the reference signal pattern of the present embodiment, but may be mapped to any resource elements within an R-PDCCH region. For example, a subcarrier interval between the reference signals within the OFDM symbol may be adjusted in various ways and N2 to N7 or N4 to N7 may be transmitted over the entire band within one OFDM symbol.

Figure 24:
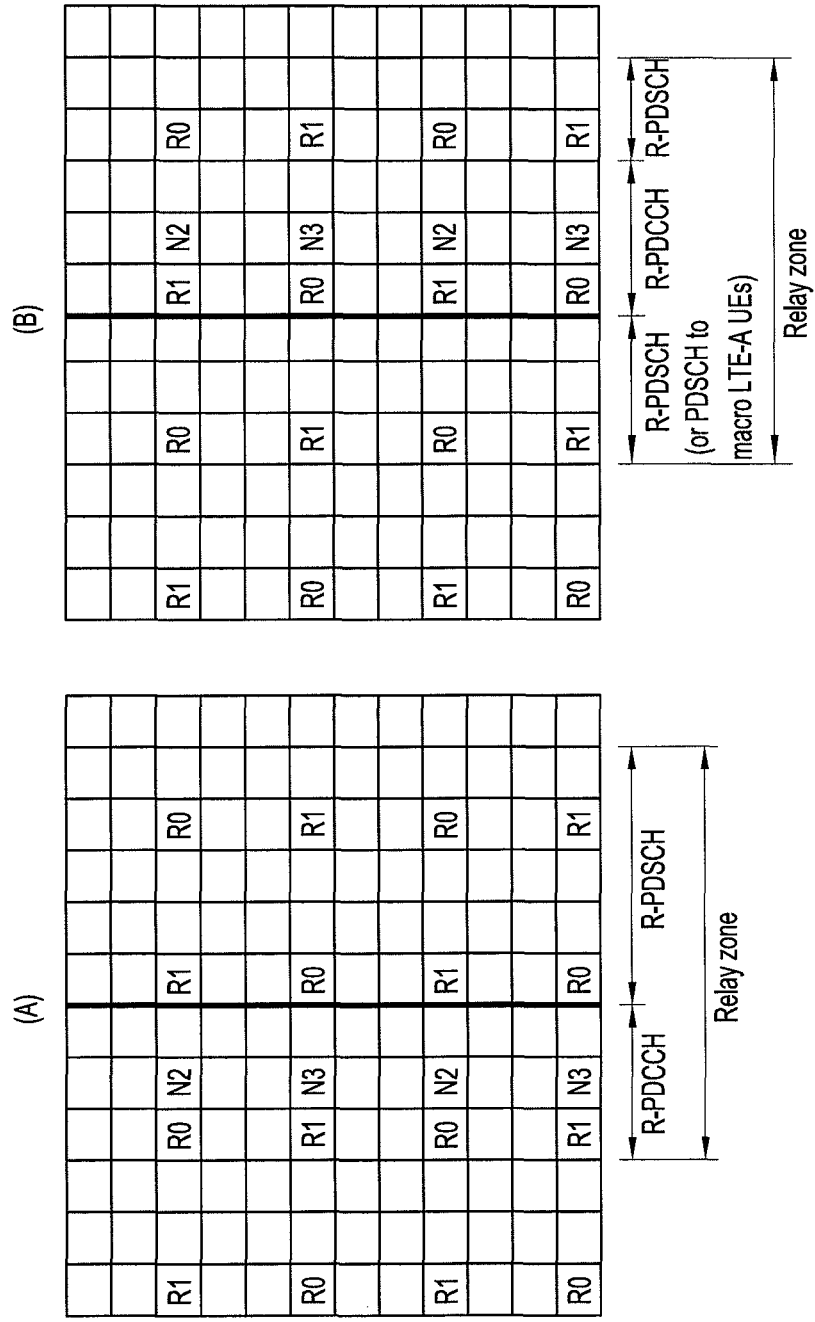
Figure 25:
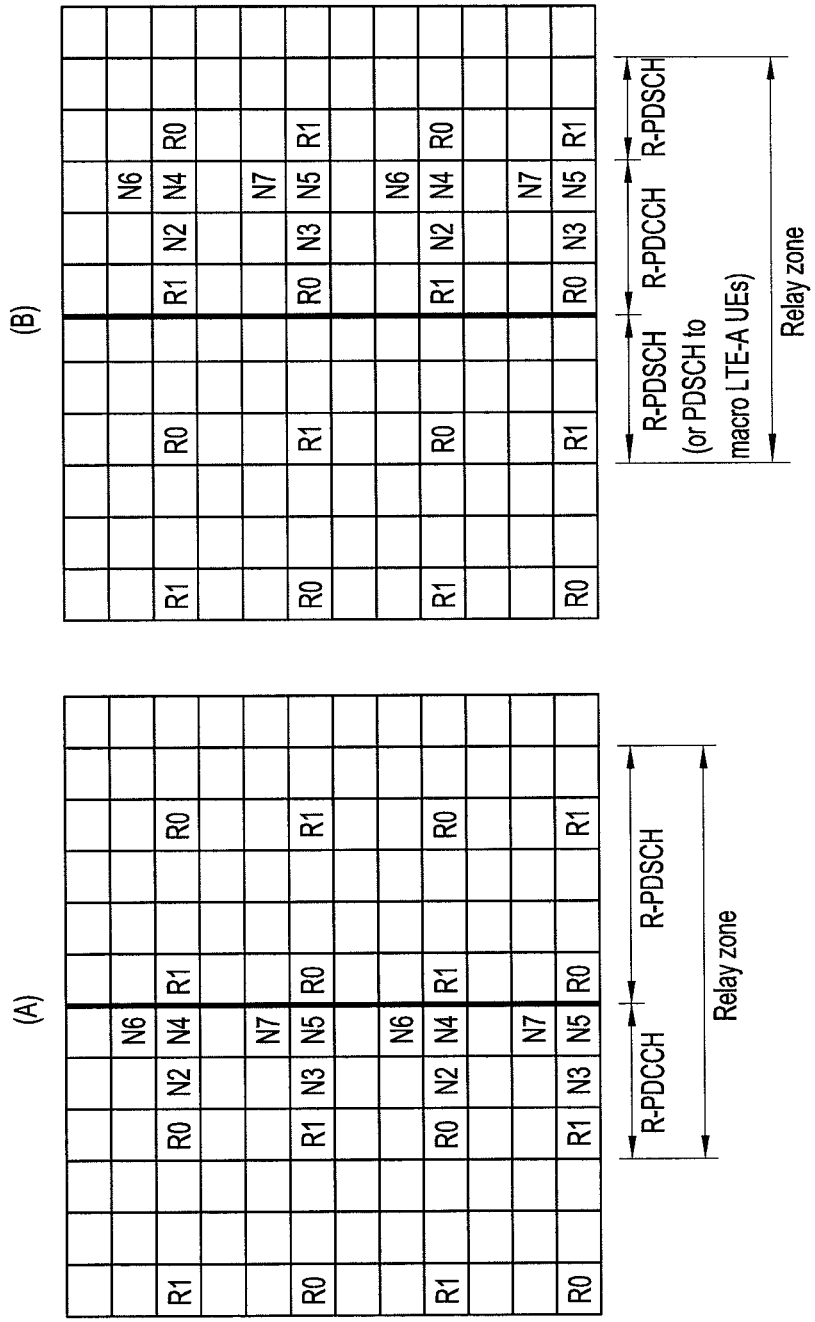
Figure 26:
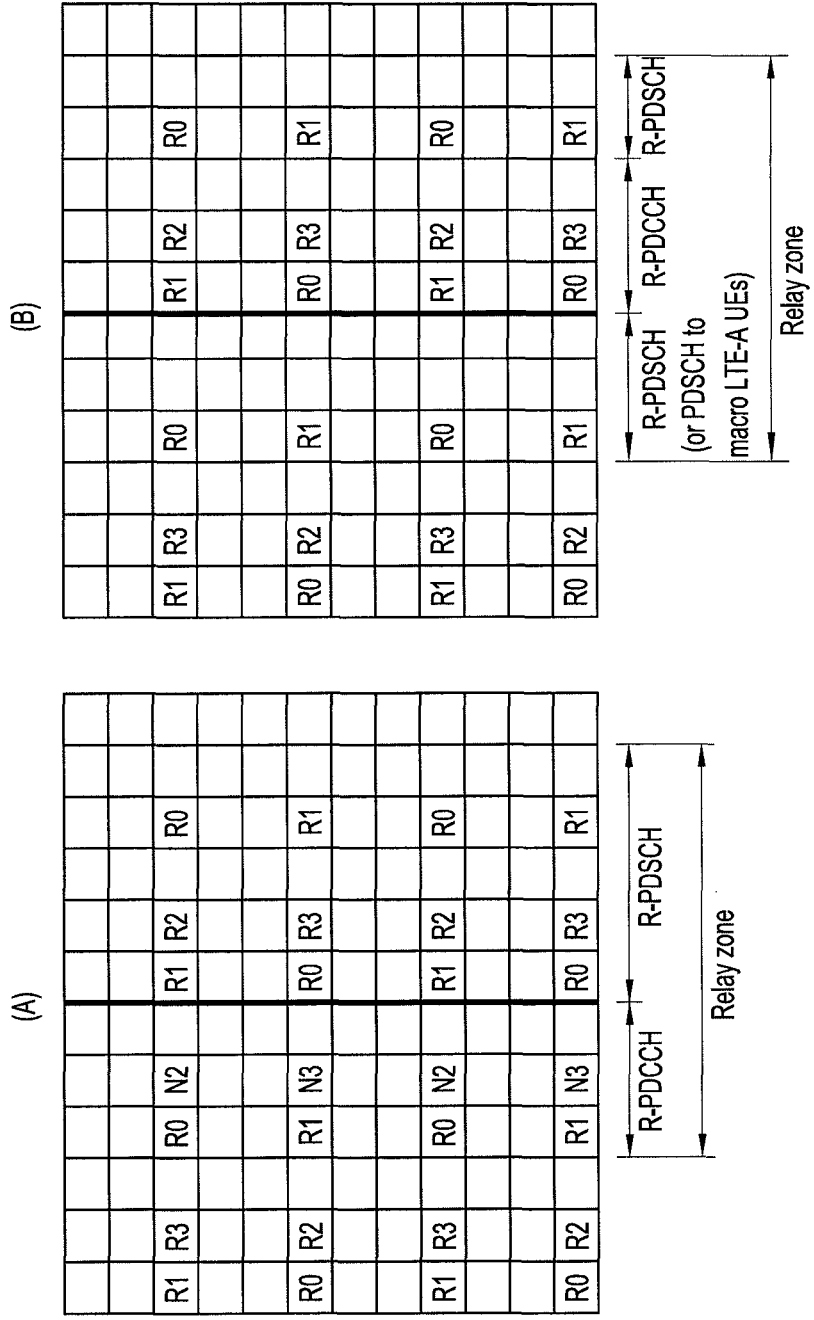
Figure 27:
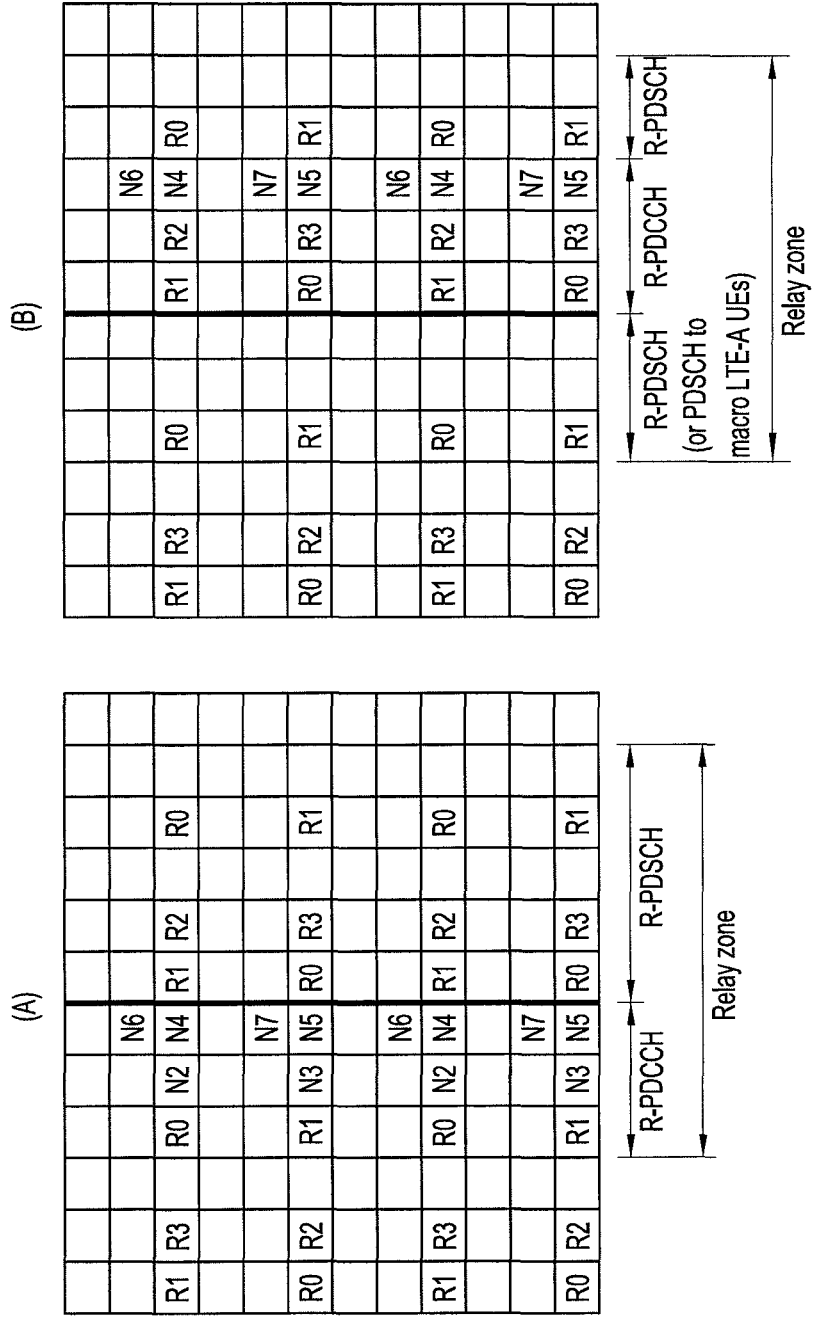

FIGS. 22 to 27 are still yet other examples of reference signal patterns according to proposed methods of transmitting reference signals. FIGS. 22 to 27 are cases of extended CPs corresponding to FIGS. 16 to 21. That is, in FIGS. 22 and 23, CRS R0 for antenna port 0 is transmitted through the CRSs of an LTE Rel-8 system. In FIGS. 24 and 25, CRSs R0 and R1 for antenna ports 0 and 1 are transmitted through the CRSs of an LTE Rel-8 system. In FIGS. 26 and 27, CRSs R0 to R3 for antenna ports 0 to 3 are transmitted through the CRSs of an LTE Rel-8 system. Furthermore, a maximum of four antennas are supported for a relay station in FIGS. 22, 24, and 26, and a maximum of eight antennas are supported for a relay station in FIGS. 23, 25, and 27. As in the embodiments described with reference to FIGS. 16 to 21, CRSs transmitted in the R-PDCCH region, from among the CRSs of the LTE Rel-8 system, may be used as reference signals for the relay station. Reference signals for the remaining antenna ports other than the antenna ports through which the CRSs are transmitted may be additionally mapped to resource elements within an R-PDCCH region. The relay station may receive the CRSs and the additionally mapped reference signals and perform channel estimation and data demodulation. The resource element to which the additional reference signals are mapped are not limited to the reference signal patterns of the present embodiments, but may be mapped to any resource elements within an R-PDCCH region. In the present embodiments, additional reference signals may be mapped to other OFDM symbols within the R-PDCCH region other than OFDM symbols to which the additional reference signals have been mapped. Furthermore, a subcarrier interval between the reference signals within the OFDM symbol may be adjusted in various ways and a plurality of reference signals may be transmitted over the entire band within one OFDM symbol.

In the above embodiments, the number of OFDM symbols allocated to the R-PDCCH has been assumed to be 3, but the present invention may be applied to all cases in which the number of OFDM symbols allocated to the R-PDCCH is 1 or higher. That is, reference signals for a relay station may be mapped inside the R-PDCCH region or outside the R-PDCCH region.

Meanwhile, the total number of resource blocks used in downlink in a case in which a bandwidth is 1.4 MHz in an LTE-A system may be 10 or less. Here, A PDCCH transmitted by a BS may be allocated up to the first 4 OFDM symbols in a subframe. Accordingly, an R-PDCCH may be started from the fifth OFDM symbol in the subframe. In this case, a reference signal pattern different from the reference signal patterns of FIGS. 16 to 27 is necessary.

Figure 28:
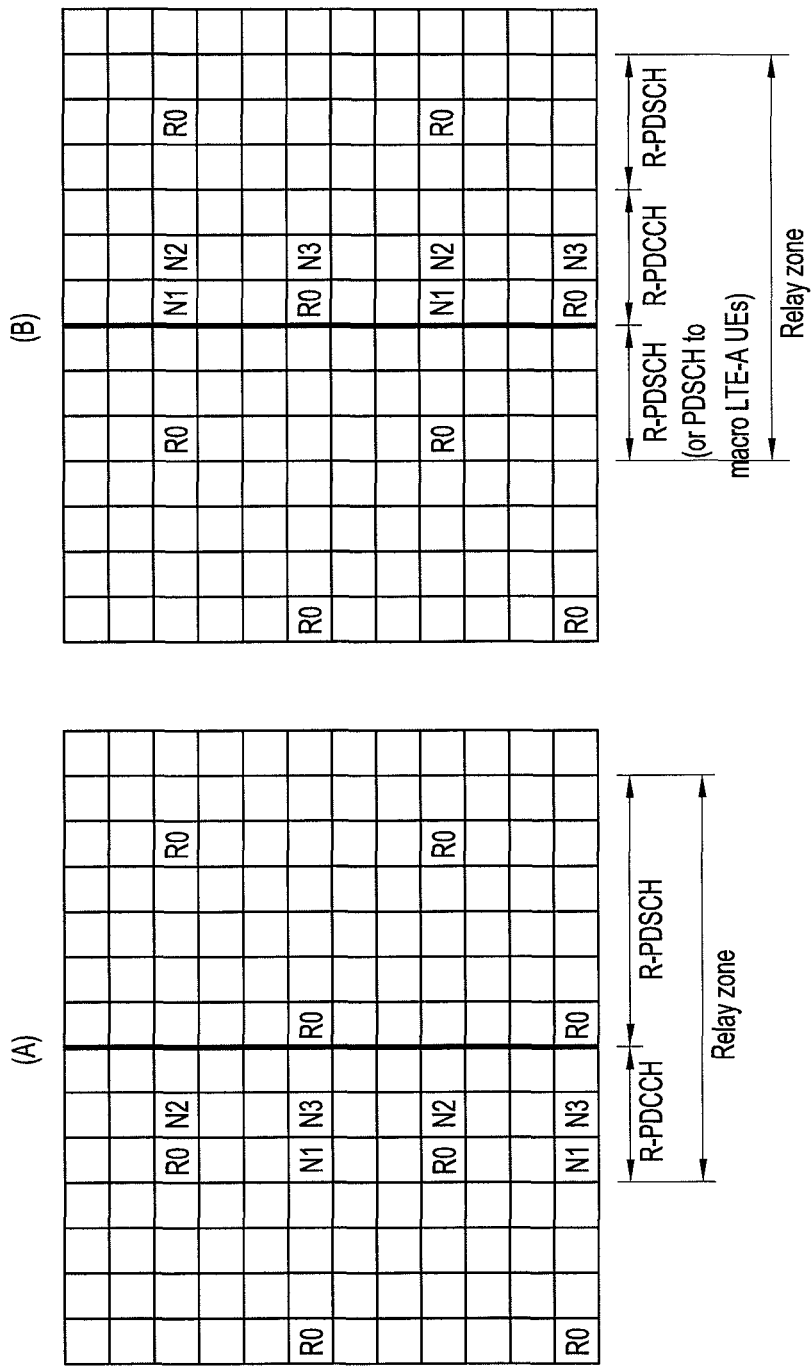
Figure 29:
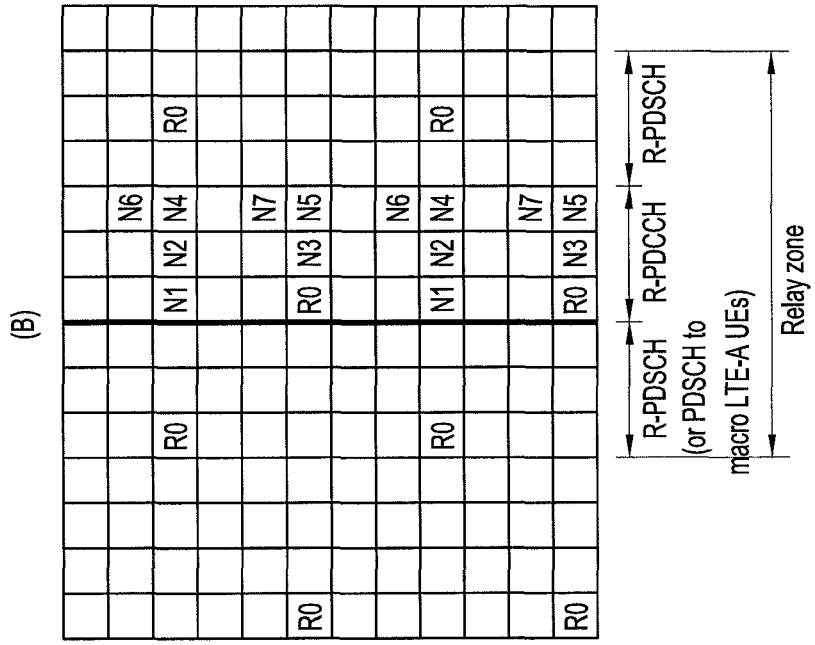
Figure 29:
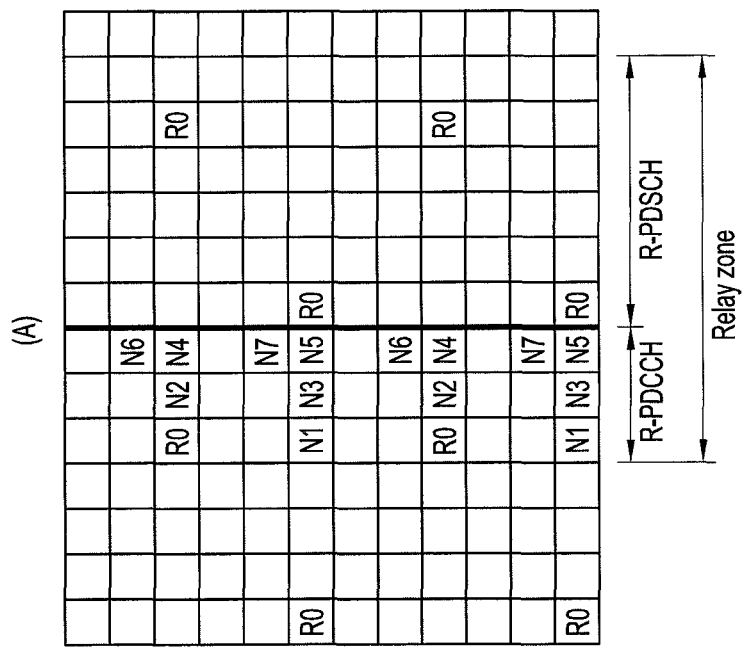

FIGS. 28 and 29 still yet other examples of reference signal patterns according to proposed methods of transmitting reference signals.

FIGS. 28 and 29 correspond to normal CPs, and they correspond to FIGS. 16 and 17. CRS R0 for antenna port 0 is transmitted, and CRS R0 transmitted in an R-PDCCH region, from among the transmitted CRSs R0, may be used as reference signals for a relay station. That is, in FIGS. 28(a) and 29(a), the CRS R0 transmitted in a fifth OFDM symbol within the R-PDCCH region may be used by a relay station. In FIGS. 28(b) and 29(b), the CRS R0 transmitted in an eighth OFDM symbol within the R-PDCCH region may be used by the relay station. Reference signals for the remaining antenna ports other than the antenna ports 0 may be additionally mapped to resource elements within the R-PDCCH region. The relay station may receive the CRS R0 and the additionally mapped reference signals and perform channel estimation and data demodulation. FIG. 28 is a case in which a maximum of four antennas are supported for the relay station, and FIG. 29 is a case in which a maximum of eight antennas are supported for the relay station. Resource elements to which the additional reference signals are mapped are not limited to the reference signal patterns of the present embodiments, but may be mapped to any resource elements within an R-PDCCH region. In the present embodiments, additional reference signals may be mapped to other OFDM symbols within the R-PDCCH region other than OFDM symbols to which the additional reference signals have been mapped. Furthermore, a subcarrier interval between the reference signals within the OFDM symbol may be adjusted in various ways and a plurality of reference signals may be transmitted over the entire band within one OFDM symbol.

Figure 30:
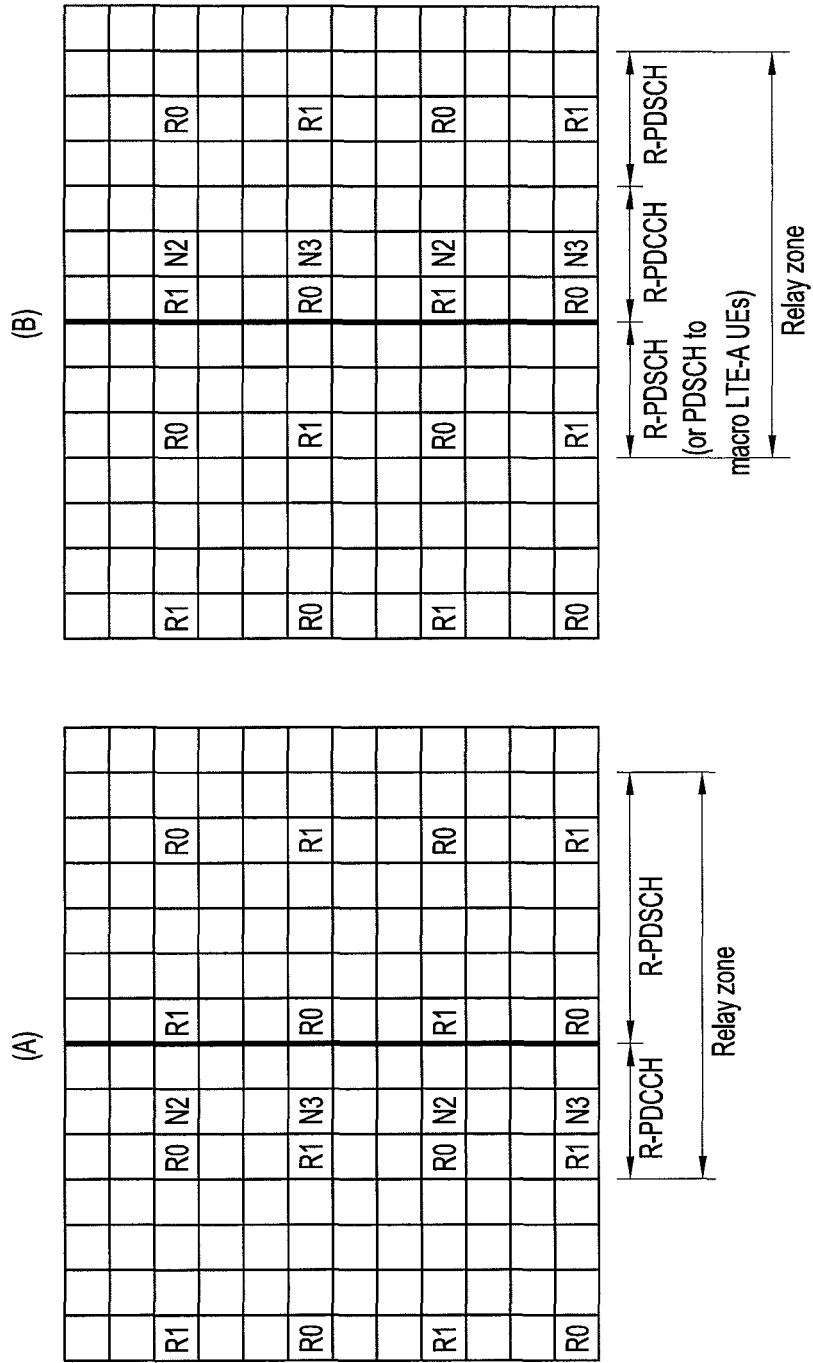
Figure 31:
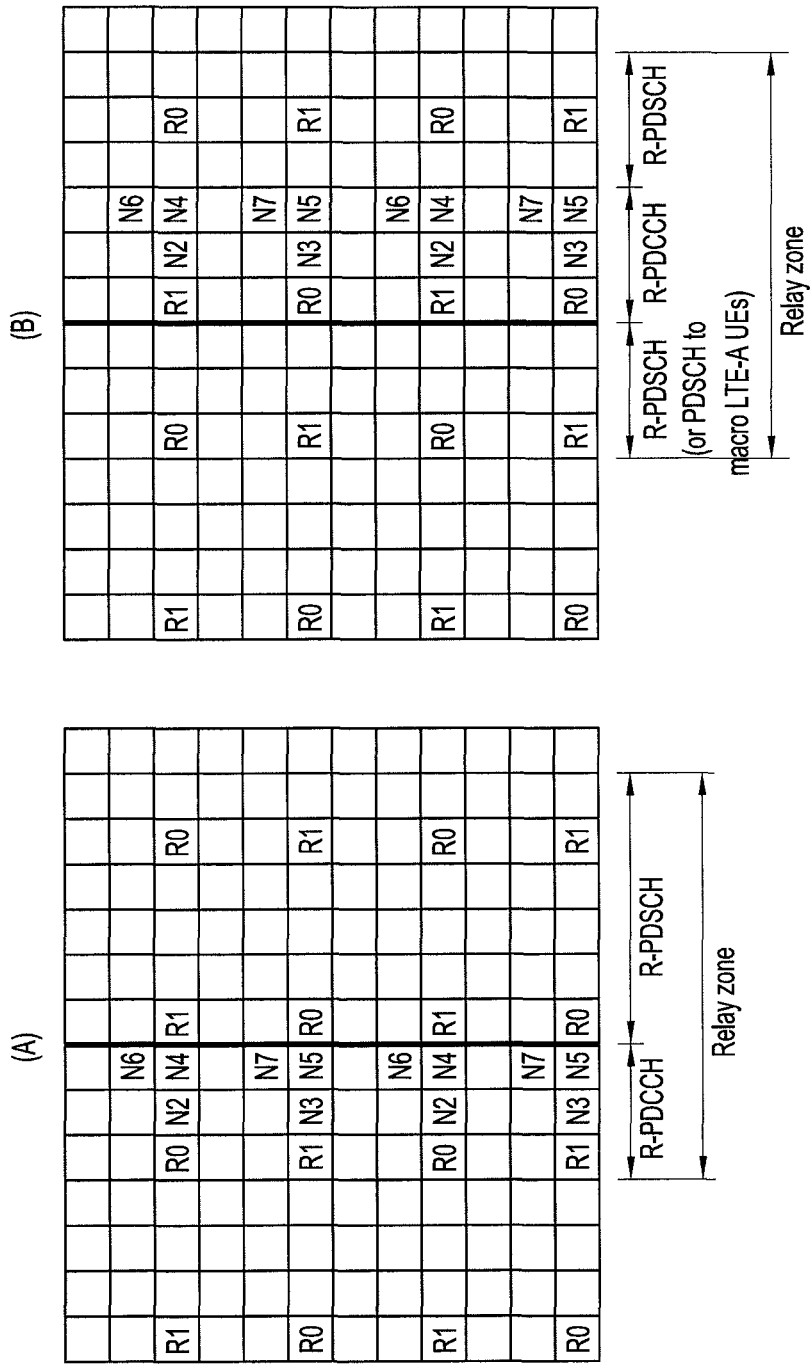

FIGS. 30 and 31 are still yet other examples of reference signal patterns according to proposed methods of transmitting reference signals.

FIGS. 30 and 31 correspond to normal CPs, and they correspond to FIGS. 18 and 19. CRSs R0 and R1 for antenna ports 0 and 1 are transmitted and CRSs R0 and R1 transmitted in an R-PDCCH region, from among the transmitted CRSs R0 and R1, may be used as reference signals for a relay station. That is, in FIGS. 30(a) and 31(a), the CRSs R0 and R1 transmitted in a fifth OFDM symbol within the R-PDCCH region may be used by the relay station. In FIGS. 30(b) and 31(b), the CRSs R0 and R1 transmitted in an eighth OFDM symbol within the R-PDCCH region may be used by the relay station. Reference signals for the remaining antenna ports other than the antenna ports 0 and 1 may be additionally mapped to resource elements within the R-PDCCH region. The relay station may receive the CRSs R0 and R1 and the additionally mapped reference signals and perform channel estimation and data demodulation. FIG. 30 is a case in which a maximum of four antennas are supported for the relay station, and FIG. 31 is a case in which a maximum of eight antennas are supported for the relay station. Resource elements to which the additional reference signals are mapped are not limited to the reference signal patterns of the present embodiments, but may be mapped to any resource elements within an R-PDCCH region. In the present embodiments, additional reference signals may be mapped to other OFDM symbols within the R-PDCCH region other than OFDM symbols to which the additional reference signals have been mapped. Furthermore, a subcarrier interval between the reference signals within the OFDM symbol may be adjusted in various ways and a plurality of reference signals may be transmitted over the entire band within one OFDM symbol.

Figure 32:
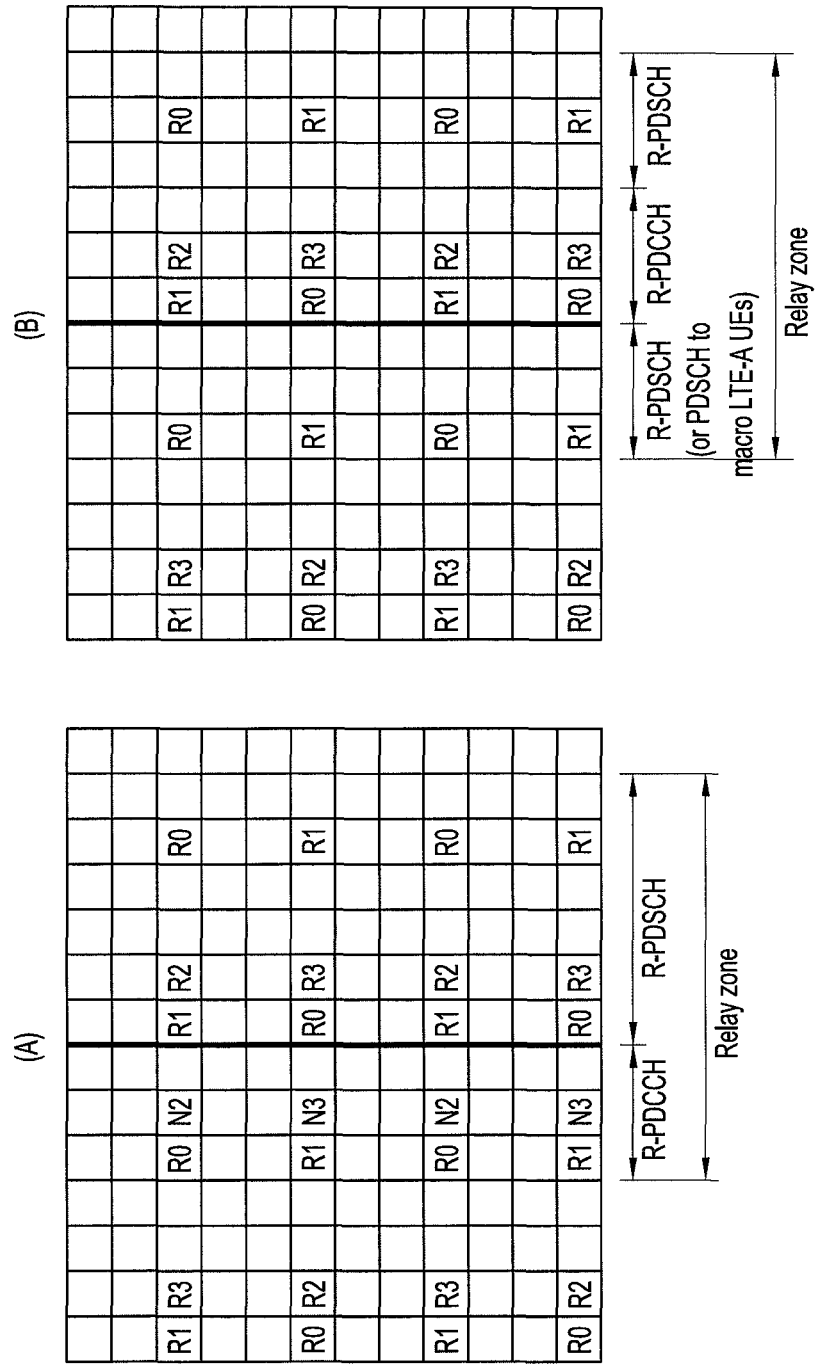
Figure 33:
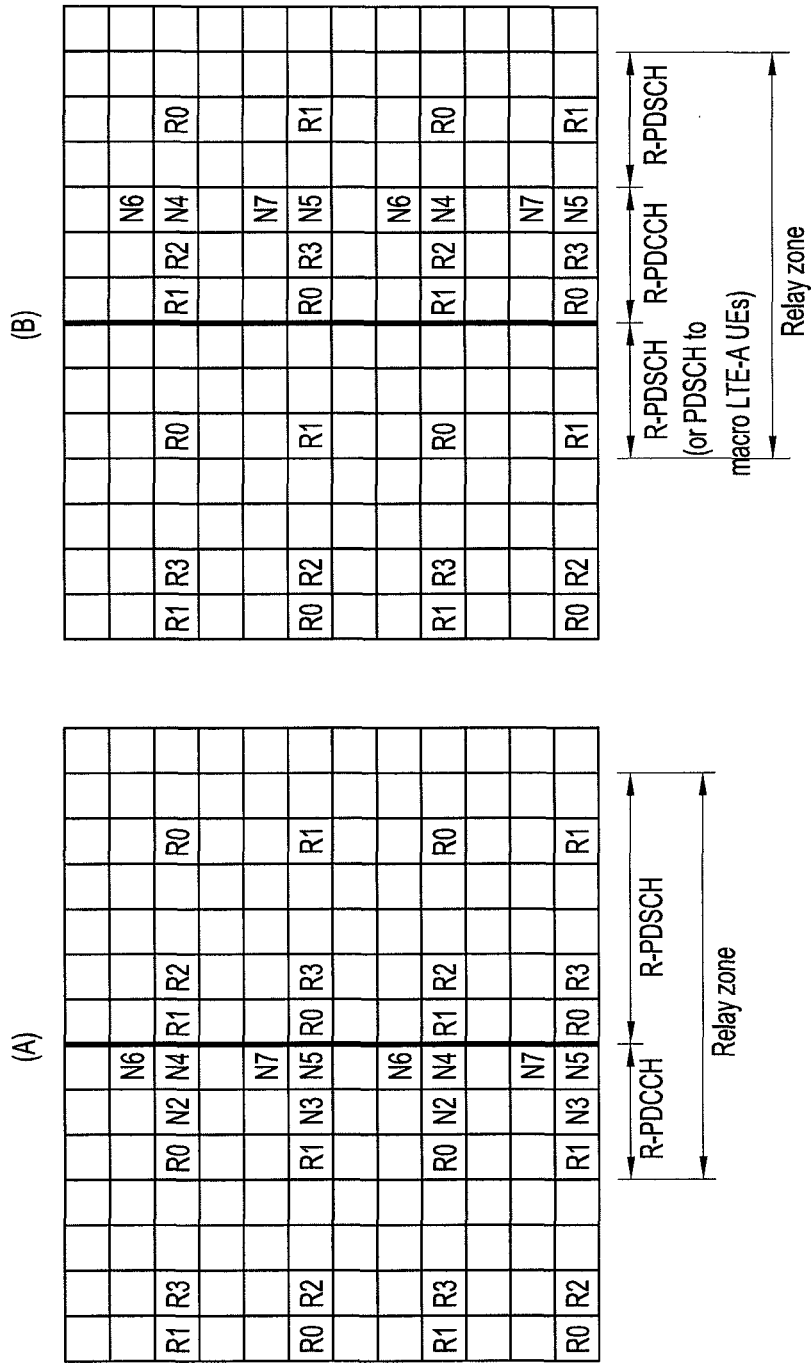

FIGS. 32 and 33 are still yet other examples of reference signal patterns according to proposed methods of transmitting reference signals.

FIGS. 32 and 33 correspond to normal CPs, and they correspond to FIGS. 20 and 21. CRSs R0 to R3 for antenna ports 0 to 3 are transmitted, and CRSs R0 to R3 transmitted in an R-PDCCH region, from among the transmitted CRSs R0 to R3 may be used reference signals for a relay station. That is, in FIGS. 32(a) and 33(a), the CRSs R0 and R1 transmitted in a fifth OFDM symbol within the R-PDCCH region may be used by the relay station. In FIGS. 32(b) and 33(b), the CRSs R0 to R3 transmitted in eighth and ninth OFDM symbols within the R-PDCCH region may be used by the relay station. Reference signals for the remaining antenna ports other than the antenna ports 0 to 3 may be additionally mapped to resource elements within the R-PDCCH region. In FIG. 32(b), since the CRSs R0 to R3 for the antenna ports 0 to 3 of an LTE Rel-8 system are transmitted within the R-PDCCH region, reference signals for a relay station need not to be additionally mapped in order to support a maximum of four antennas. The relay station may receive the CRSs R0 to R3 and the additionally mapped reference signals and perform channel estimation and data demodulation. FIG. 32 is a case in which a maximum of four antennas are supported for the relay station, and FIG. 33 is a case in which a maximum of eight antennas are supported for the relay station. Resource elements to which the additional reference signals are mapped are not limited to the reference signal patterns of the present embodiments, but may be mapped to any resource elements within an R-PDCCH region. In the present embodiments, additional reference signals may be mapped to other OFDM symbols within the R-PDCCH region other than OFDM symbols to which the additional reference signals have been mapped. Furthermore, a subcarrier interval between the reference signals within the OFDM symbol may be adjusted in various ways and a plurality of reference signals may be transmitted over the entire band within one OFDM symbol.

The embodiments of FIGS. 28 to 33 may also be applied to the case of an extended CP. However, the CRSs transmitted in the first slot cannot be used for a relay station because the first 4 OFDM symbols in the subframe are allocated to PDCCHs transmitted by a BS. Accordingly, the CRSs R0 and R1 allocated to the fourth OFDM symbol of the first slot may be used as reference signals for the relay station by replacing the CRSs R0 and R1 with the CRSs R0 and R1 allocated to the first OFDM symbol of the second slot. That is, if the PDCCHs occupy the first 4 OFDM symbols, the first OFDM symbol of the second slot may be used as reference signals for a relay station because the R-PDCCH is allocated from the fifth OFDM symbol. Reference signals for the remaining antenna ports other than antenna ports through which the CRSs are transmitted may be additionally mapped to resource elements within the R-PDCCH region. The relay station may receive the CRSs and the additionally mapped reference signals and perform channel estimation and data demodulation. Resource elements to which the additional reference signals are mapped are not limited to the reference signal pattern of the present embodiment, but may be mapped to any resource elements within an R-PDCCH region. In the present embodiment, additional reference signals may be mapped to other OFDM symbols within the R-PDCCH region other than OFDM symbols to which the additional reference signals have been mapped. Furthermore, a subcarrier interval between the reference signals within the OFDM symbol may be adjusted in various ways and a plurality of reference signals may be transmitted over the entire band within one OFDM symbol.

Meanwhile, CRSs transmitted by a BS are used as in the embodiments, but the CRSs and reference signals for additional antenna ports may be multiplexed using at least one of a code division multiplexing (CDM) scheme, a time division multiplexing (TDM) scheme, and a frequency division multiplexing (FDM) scheme. A hybrid multiplexing scheme may be used by combining two or more of the multiplexed schemes.

Figure 34:
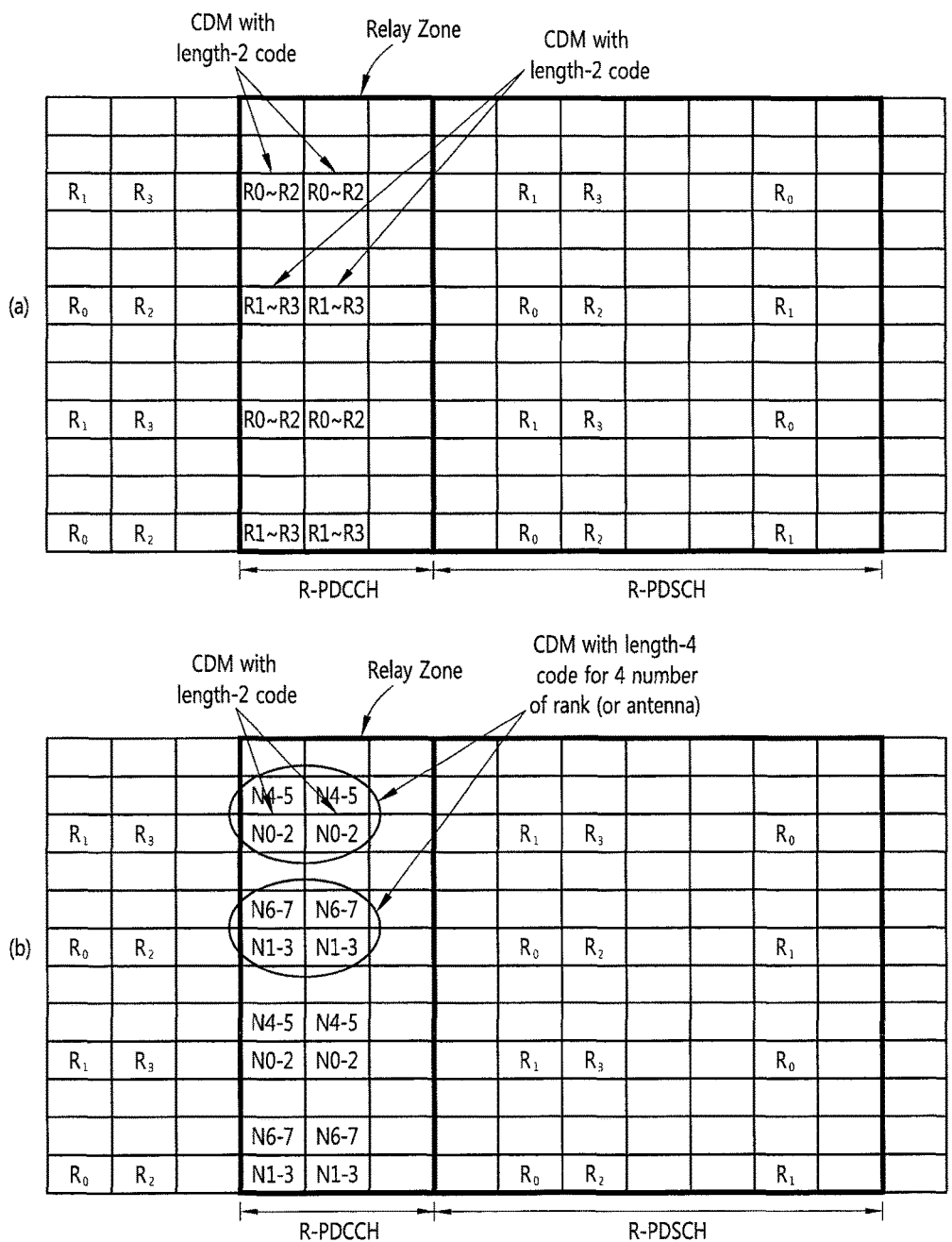

FIG. 34 is further yet another example of a reference signal pattern according to a proposed method of transmitting reference signals. In FIG. 34, a plurality of reference signals is multiplexed according to the CDM scheme and the plurality of multiplexed reference signals is mapped in the time domain. FIG. 34(a) is a case in which a maximum of four antennas are supported. Each of CRSs R0 and R2 and CRSs R1 and R3 may be multiplexed by using a code having a length of 2 as an orthogonal code according to the CDM scheme and then mapped to fourth and fifth OFDM symbols. Various kinds of codes, such as a DFT code and a Walsh code, may be used as the orthogonal code. Like FIG. 34(a), FIG. 34(b) is a case in which a maximum of eight antennas are supported. Each of (N0, N2), (N1, N3), (N4, N5), and (N6, N7) may be multiplexed by using a code having a length of 2 as an orthogonal code according to the CDM scheme and then mapped to fourth and fifth OFDM symbols.

Figure 35:
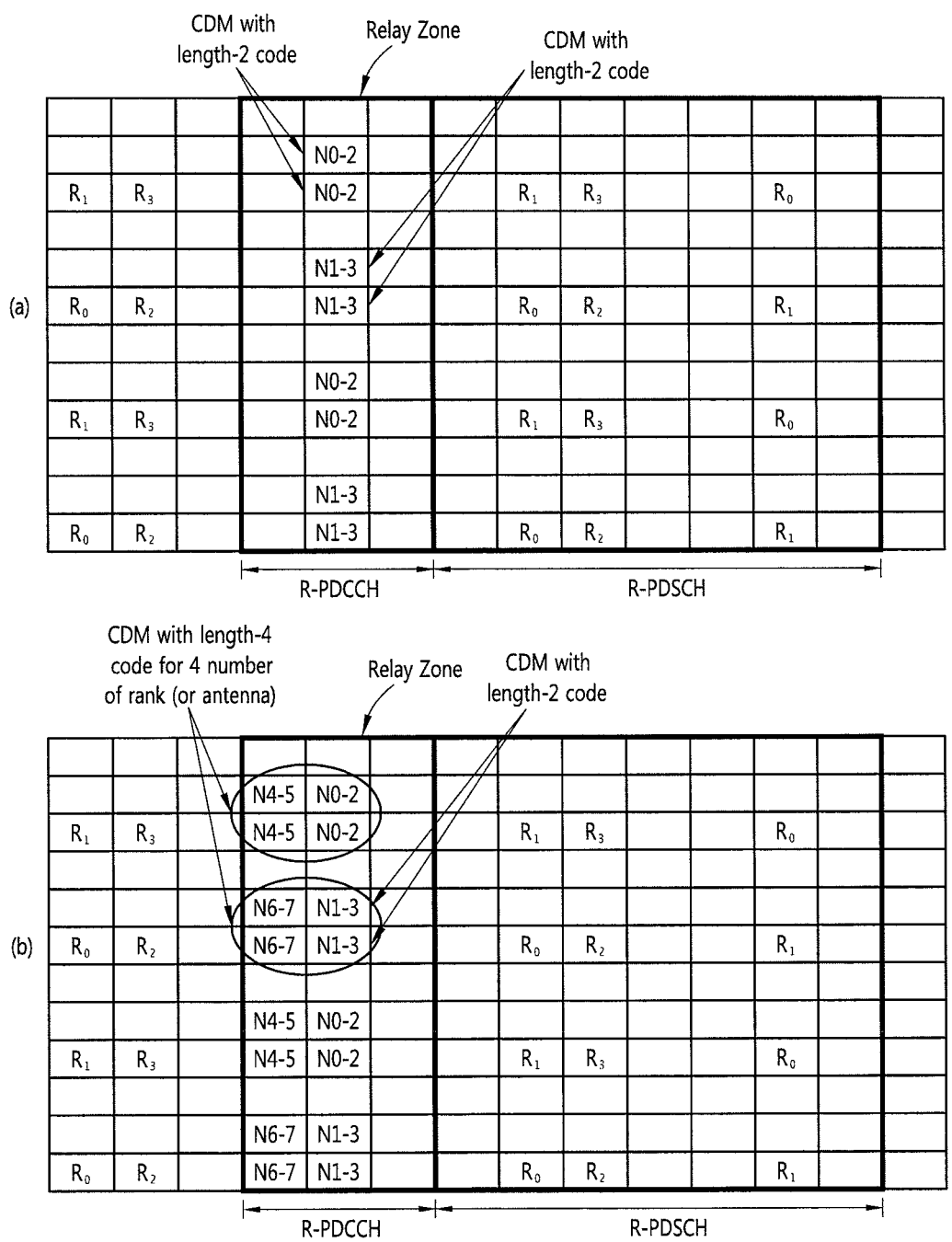

FIG. 35 is further yet another example of a reference signal pattern according to a proposed method of transmitting reference signals. In FIG. 35, a plurality of reference signals is multiplexed according to the CDM scheme, and the plurality of multiplexed reference signals is mapped in the frequency domain. FIG. 35(a) is a case in which a maximum of four antennas are supported. Each of N0 and N2 and N1 and N3 may be multiplexed by using a code having a length of 2 as an orthogonal code according to the CDM scheme and then mapped to a fifth OFDM symbol. Various kinds of codes, such as a DFT code and a Walsh code, may be used as the orthogonal code. Like FIG. 35(a), FIG. 35(b) is a case in which a maximum of eight antennas are supported. Each of (N0, N2), (N1, N3), (N4, N5), and (N6, N7) may be multiplexed by using a code having a length of 2 as an orthogonal code according to the CDM scheme and then mapped to fourth and fifth OFDM symbols, and each of (N0, N2, N4, N5) and (N1, N3, N6, N7) may be multiplexed by using a code having a length of 4 as an orthogonal code according to the CDM scheme and then mapped to the fourth and the fifth OFDM symbols.

Figure 36:
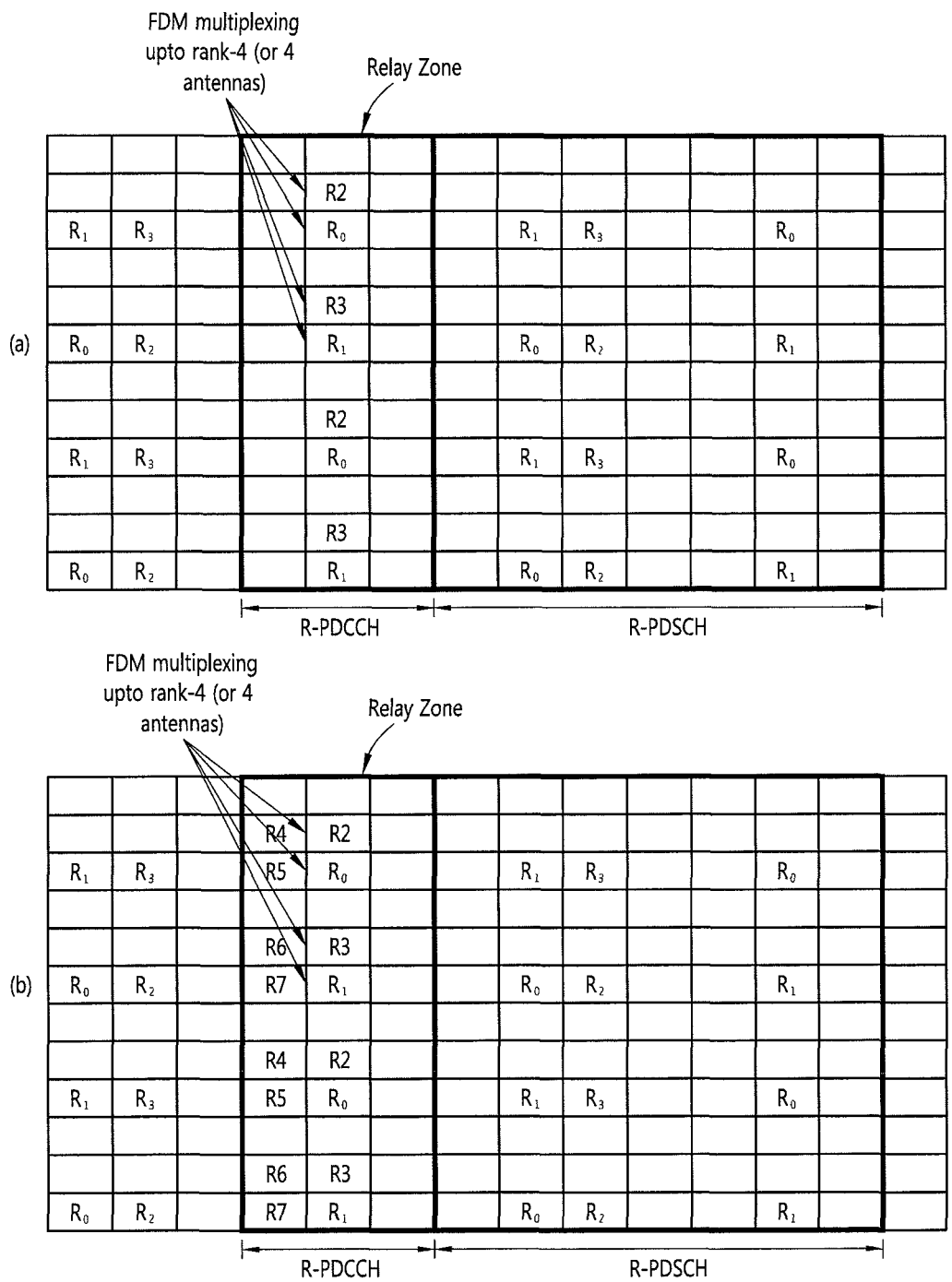

FIG. 36 is further yet another example of a reference signal pattern according to a proposed method of transmitting reference signals. In FIG. 36, a plurality of reference signals is multiplexed according to the FDM scheme. FIG. 36(a) is a case in which a maximum of four antennas are supported. In FIG. 36(a), CRSs R0 to R3 may be multiplexed according to the FDM scheme and mapped to a fifth OFDM symbol. FIG. 36(b) is a case in which a maximum of eight antennas are supported. As in FIG. 36(a), in FIG. 36(a), CRSs R0 to R3 are multiplexed according to the FDM scheme and mapped to a fifth OFDM symbol, and R4 to R7 may be multiplexed according to the FDM scheme and mapped to a fourth OFDM symbol. The position of a subcarrier to which each reference signal is mapped may be changed in various ways.

In the above embodiments, the R-PDCCHs are assumed to occupy 3 OFDM symbols, but all the embodiments of FIGS. 34 to 36 may be applied to a case in which the R-PDCCHs occupy two or more OFDM symbols.

Figure 37:
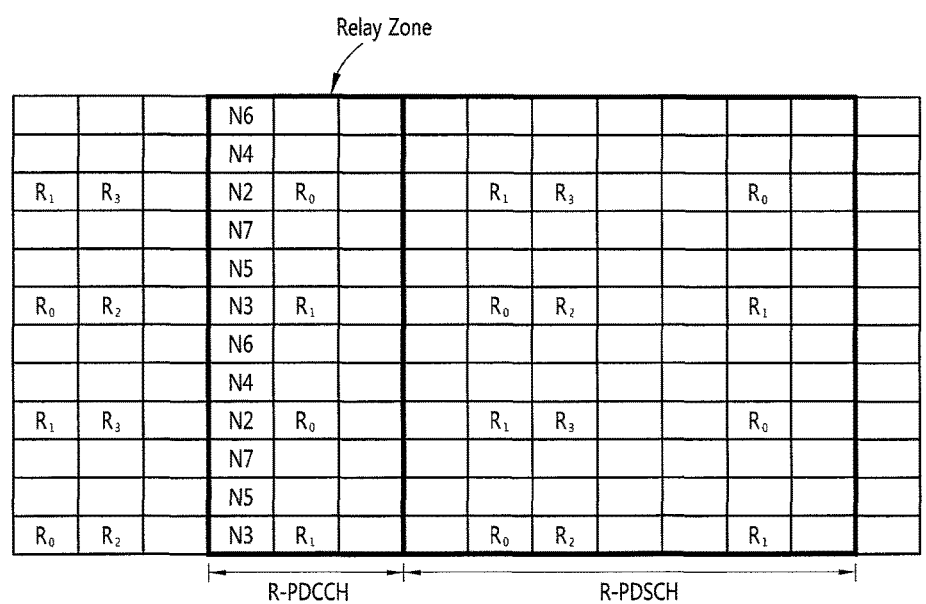

FIG. 37 is further yet another example of a reference signal pattern according to a proposed method of transmitting reference signals. Reference signals for a relay station are additionally mapped to a first OFDM symbol from among OFDM symbols allocated to an R-PDCCH. In FIG. 37, CRSs R0 and R1 may be mapped to a fifth OFDM symbol, and N2 to N7 (i.e., additional reference signals) may be mapped to a fourth OFDM symbol. In FIG. 37, the R-PDCCH has been assumed to occupy 3 OFDM symbols, but the embodiment of FIG. 37 may be applied to all cases in which the R-PDCCH occupies 3 or more OFDM symbols.

Figure 38:
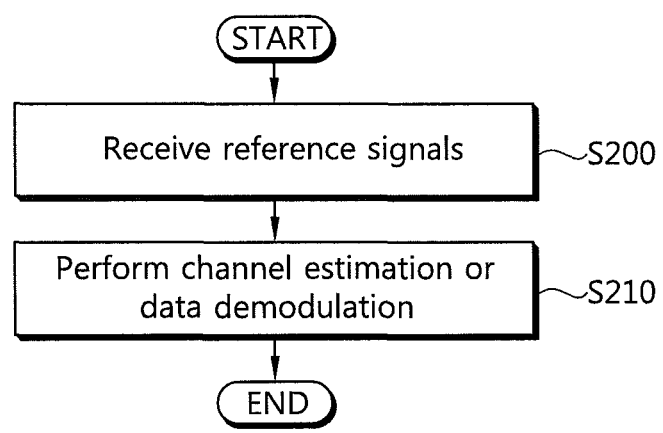
FIG. 38 is an embodiment of the proposed method of estimating channels.

FIG. 38 is an embodiment of the proposed method of estimating channels.

At step S200, a relay station receives a plurality of reference signals from a BS through the relay zone of a downlink subframe. The plurality of reference signals may be the CRSs of an LTE Rel-8 system and additional reference signals for the relay station. Furthermore, the plurality of reference signals may be mapped to an R-PDCCH region. At step S210, the relay station performs channel estimation or data demodulation by processing the plurality of reference signals.

Figure 39:
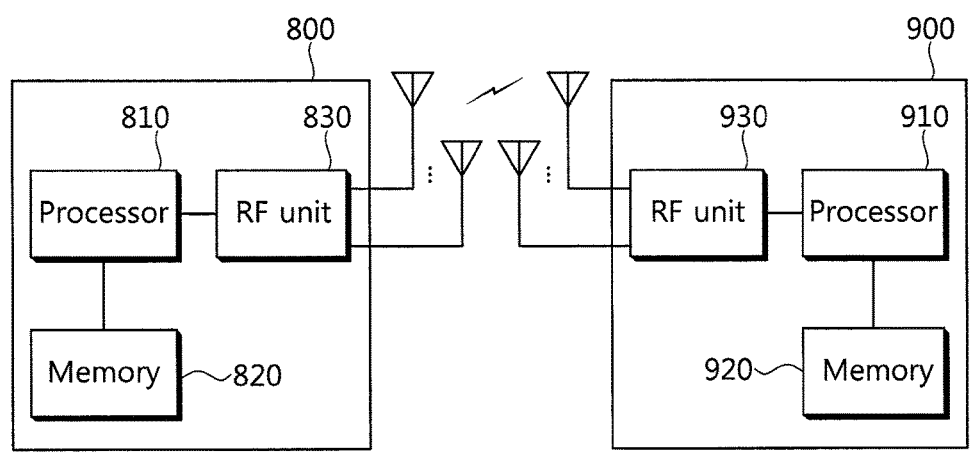
FIG. 39 is a block diagram showing a BS and a relay station in which the embodiments of the present invention are implemented.

FIG. 39 is a block diagram showing a BS and a relay station in which the embodiments of the present invention are implemented.

The BS 800 includes a processor 810, memory 820, and a radio frequency (RF) unit 830. The processor 810 implements the proposed functions, processes and/or methods. The processor 810 generates a plurality of reference signals for a plurality of antenna ports and maps the plurality of reference signals to at least one resource block according to a specific reference signal pattern. When the plurality of reference signals is mapped to at least one resource block, the CRSs of an LTE Rel-8 system may be used, and reference signals for additional antenna ports may be additionally mapped to resource elements. Furthermore, the plurality of reference signals may be mapped to an R-PD- CCH region. The reference signal patterns of FIGS. 16 to 37 may be formed by the processor 810 of the BS 800. The layers of a radio interface protocol may be implemented by the processor 810. The memory 820 is coupled to the processor 810, and it stores various pieces of information for driving the processor 810. The RF unit 830 is coupled to the processor 810, and it transmits and/or receives radio signals and transmits the at least one resource block to a relay station.

The relay station 900 includes a processor 910, memory 920, and an RF unit 930. The RF unit 930 is coupled to the processor 910, and it transmits and/or receives radio signals and receives a plurality of reference signals. The plurality of reference signals may be the CRSs of an LTE Rel-8 system and additional reference signals for the relay station. Furthermore, the plurality of reference signals may be mapped to an R-PDCCH region. The processor 910 implements the proposed functions, processes and/or methods. The processor 910 performs channel estimation or data demodulation by processing the plurality of reference signals. The layers of a radio interface protocol may be implemented by the processor 910. The memory 920 is coupled to the processor 910, and it stores various pieces of information for driving the processor 910.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for demodulating, by a relay node (RN), a relay physical downlink control channel (R-PDCCH) in a wireless communication system, the method comprising:
   demodulating the R-PDCCH based on cell-specific reference signals transmitted on at least one first antenna port or based on user equipment (UE)-specific reference signals transmitted on a second antenna port,
   wherein a type of reference signals among the cell-specific reference signals or the UE-specific reference signals, which is being used to demodulate the R-PDCCH, is configured by a higher layer.

2. The method of claim 1, further comprising:
   receiving a reference signal indicator, which indicates the type of the reference signals used to demodulate the R-PDCCH, from a base station (BS) through the higher layer.

3. The method of claim 1, wherein a number of at least one first antenna port is one of 1, 2 or 4.

4. The method of claim 3, wherein the at least one first antenna port is antenna port {0}, {0, 1} or {0, 1, 2, 3}, respectively, when the number of at least one first antenna port is 1, 2 or 4, respectively.

5. The method of claim 1, wherein a number of the at least one second antenna port is 1.

6. The method of claim 1, wherein the R-PDCCH is mapped to resource elements in at least one physical resource block (PRB).

7. The method of claim 1, wherein the R-PDCCH is included in a relay zone used for communication between the RN and a base station (BS).

8. A relay node (RN) in a wireless communication system, the RN comprising:
   a memory;
   a radio frequency (RF) unit; and
   a processor, coupled to the memory and the RF unit, and that demodulates a relay physical downlink control channel (R-PDCCH) based on cell-specific reference signals transmitted on at least one first antenna port or based on user equipment (UE)-specific reference signals transmitted on a second antenna port,
   wherein a type of reference signals among the cell-specific reference signals or the UE-specific reference signals, which is being used to demodulate the R-PDCCH, is configured by a higher layer.

9. The RN of claim 8, wherein the RF unit receives a reference signal indicator, which indicates the type of the reference signals used to demodulate the R-PDCCH, from a base station (BS) through the higher layer.

10. The RN of claim 8, wherein a number of at least one first antenna port is one of 1, 2 or 4.

11. The RN of claim 10, wherein the at least one first antenna port is antenna port {0}, {0, 1} or {0, 1, 2, 3}, respectively, when the number of at least one first antenna port is 1, 2 or 4, respectively.

12. The RN of claim 8, wherein a number of the at least one second antenna port is 1.

13. The RN of claim 8, wherein the R-PDCCH is mapped to resource elements in at least one physical resource block (PRB).

14. The RN of claim 8, wherein the R-PDCCH is included in a relay zone used for communication between the RN and a base station (BS).

* * * * *